(12) United States Patent
Song et al.

(10) Patent No.: US 7,213,179 B2
(45) Date of Patent: May 1, 2007

(54) AUTOMATED AND EMBEDDED SOFTWARE RELIABILITY MEASUREMENT AND CLASSIFICATION IN NETWORK ELEMENTS

(75) Inventors: Sejun Song, Cupertino, CA (US); Jiandong Huang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 472 days.

(21) Appl. No.: 10/762,087

(22) Filed: Jan. 20, 2004

(65) Prior Publication Data

US 2004/0153835 A1 Aug. 5, 2004

Related U.S. Application Data

(63) Continuation-in-part of application No. 10/209,845, filed on Jul. 30, 2002, now Pat. No. 7,149,917.

(60) Provisional application No. 60/490,304, filed on Jul. 24, 2003.

(51) Int. Cl.
*G06F 11/00* (2006.01)
(52) U.S. Cl. ............... 714/48; 714/57; 709/224
(58) Field of Classification Search ............... 714/57
See application file for complete search history.

(56) References Cited

U.S. PATENT DOCUMENTS

| 5,790,431 | A * | 8/1998 | Ahrens et al. ............... 718/104 |
| 5,822,578 | A * | 10/1998 | Frank et al. ................. 712/244 |
| 6,594,786 | B1 * | 7/2003 | Connelly et al. ............. 714/50 |
| 6,747,957 | B1 * | 6/2004 | Pithawala et al. ........... 370/252 |
| 6,830,515 | B2 * | 12/2004 | Rowe ........................... 463/42 |
| 2002/0143920 | A1 * | 10/2002 | Dev et al. .................... 709/223 |
| 2003/0172153 | A1 * | 9/2003 | Vaver ......................... 709/224 |
| 2004/0078695 | A1 * | 4/2004 | Bowers et al. ................ 714/39 |
| 2004/0230872 | A1 * | 11/2004 | Mullally et al. ............... 714/38 |

OTHER PUBLICATIONS

Ali, "Analysis of Total Outage Data for Stored Program Control Switching Systems", 1986, IEEE, pp. 1044-1046.*
Sejun Song and Jim Huang, "Patent Disclosure Software Reliability Measurement and Classification", Jul. 9, 2003, pp. 1-7.
Sejun Song and Jim Huang, "IOS Software MTBF Measurement", May 28, 2003, pp. 1-28.

* cited by examiner

*Primary Examiner*—Gabriel L. Chu
(74) *Attorney, Agent, or Firm*—Marger Johnson & McCollom, P.C.

(57) ABSTRACT

The present invention provides automated kernel software outage measurement and classification. System failures are categorized into software-caused failures and hardware-caused failures. Software failures are further classified as unplanned outages and operational outages. The operational outages are then classified as unplanned operational outages and planned operational outages.

35 Claims, 19 Drawing Sheets

| MIPS ERROR CODE | DEFINITION | MAX SW FAULT | MIN SW FAULT | HW/NON-IOS FAULT | OPERATIONAL |
|---|---|---|---|---|---|
| 0 | Interrupt | X | | | |
| ... | | | | | |
| 4 | Address Error | X | X | X | |
| ... | | | | | |
| 9 | Breakpoint | X | | | X |
| ... | | | | | |
| 15 | Floating Point Error | X | X | | |

FIG. 20

Reload (Operational)

350

```
***** COOL Object Table *****
type index status last-change  AOT  NAF  object-name
 2    1     1    1051869536    0    0   Router-Device
 2    2     1    1051869537    0    0   MIN-IOS-SW
 2    3     1    1051869537    0    0   MAX-IOS-SW
                               0    0   PLANNED OPERATIONAL
                                        UNPLANNED OPERATIONAL
7507-S1202#reload
```

Restarted

352

```
***** COOL Object Table *****
type index status last-change  AOT  NAF  object-name
 2    1     1    1051869890   291   1   Router-Device
 2    2     1    1051869890    0    0   MIN-IOS-SW
 2    3     1    1051869890    0    0   MAX-IOS-SW
                              291       PLANNED OPERATIONAL
                               0        UNPLANNED OPERATIONAL
7507-S1202#
```

FIG. 21A

ERROR code = Breakpoint 9

```
7507-S1202#sh cool obj
** COOL Object Table ** type index status last-change    AOT   NAF  object-name 2    1     1     1051870525    591    2   Router-Device
 2    2     1     1051870525      0    0   MIN-IOS-SW
 2    3     1     1051870525    279    1   MAX-IOS-SW
                                 241    -   PLANNED OPERATIONAL
                                 279    -   UNPLANNED OPERATIONAL
7507-S1202#
```
354

ERROR code = Address Error 4

```
7507-S1202#sh cool obj
** COOL Object Table ** type index status last-change    AOT   NAF  object-name 2    1     1     1051871097    888    3   Router-Device
 2    2     1     1051871097    280    1   MIN-IOS-SW
 2    3     1     1051871097    559    2   MAX-IOS-SW
                                 241    -   PLANNED OPERATIONAL
                                 279    -   UNPLANNED OPERATIONAL
7507-S1202#
```
356

FIG. 21B

AUTOMATED AND EMBEDDED SOFTWARE RELIABILITY MEASUREMENT AND CLASSIFICATION IN NETWORK ELEMENTS

This application claims the benefit of prior U.S. Provisional Patent Ser. No. 60/490,304 filed Jul. 24, 2003. This application is also a Continuation In Part of U.S. patent Ser. No. 10/209,845 filed Jul. 30, 2002 now U.S. Pat. No. 7,149,917, entitled: METHOD AND APPARATUS FOR OUTAGE MEASUREMENT in which PCT/US03/23878 was filed from on Jul. 30, 2003.

BACKGROUND

Measurement of software reliability is essential for assessing and improving the availability of network elements such as routers and switches and for efficiently and effectively trouble shooting. For example, kernel software refers to the core operating system software used for controlling the execution of a Route Processor (RP). Failure of the kernel software will cease operation of the RP, leading to a complete RP outage. Measurement of kernel software outages and classifying reasons for these software outages are especially important for high availability network operations.

Prediction and measurement of Mean Time Between Failure (MTBF) are two major software reliability estimation approaches. Unlike hardware MTBF estimation, the prediction of software MTBF is very difficult due to the lack of systemic techniques. There have been several attempts to predict software MTBF based upon lines of code, bugs, "if" statements, etc. However, these techniques are still experimental and have not been proven effective in commercial applications.

Certain crash information currently exists for measuring kernel software MTBF in the field. One technique monitors a network device's reboot reason via Simple Network Management Protocol (SNMP) notification from a special Network Management Server (NMS). The software MTBF is stored and calculated in a remote NMS device. In another process, all error and register related information is dumped into a persistent memory file during router crash time. This file is then reviewed manually off-line for software MTBF calculation and analysis. However, this reboot information and the manual techniques mentioned above do not address the need for accuracy, scalability, cost effectiveness, and manageability.

For example, the SNMP based measurements can be lost due to unreliable SNMP traps of the remote device based measurement. The SNMP based measurements also can not capture certain software failure events such as a standby RP failure or a forced switch-over event in dual-RP systems. There are also no specific rules for distinguishing software-caused crashes from other types of router crashes.

Current outage measurement schemes are also unable to automatically distinguish operations related to software outage events. Thus, all dumped crash information has to be manually searched by a system administrator for specific types of software related outage information. Outage reasons and MTBF information then has to be manually generated by the system administrator.

The present invention addresses this and other problems associated with the prior art.

SUMMARY OF THE INVENTION

The present invention provides automated kernel software outage measurement and classification. System failures are categorized into software-caused failures and hardware-caused failures. Software failures are further classified as unplanned outages and operational outages. The operational outages are then classified as unplanned operational outages and planned operational outages. The failures for the different categories are then automatically measured.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 20 is a chart showing how errors codes are classified by the network processing device in FIG. 18.

FIGS. 21A and 21B are outage reports generated by the network processing device in FIG. 18.

DETAILED DESCRIPTION

Figure 1:
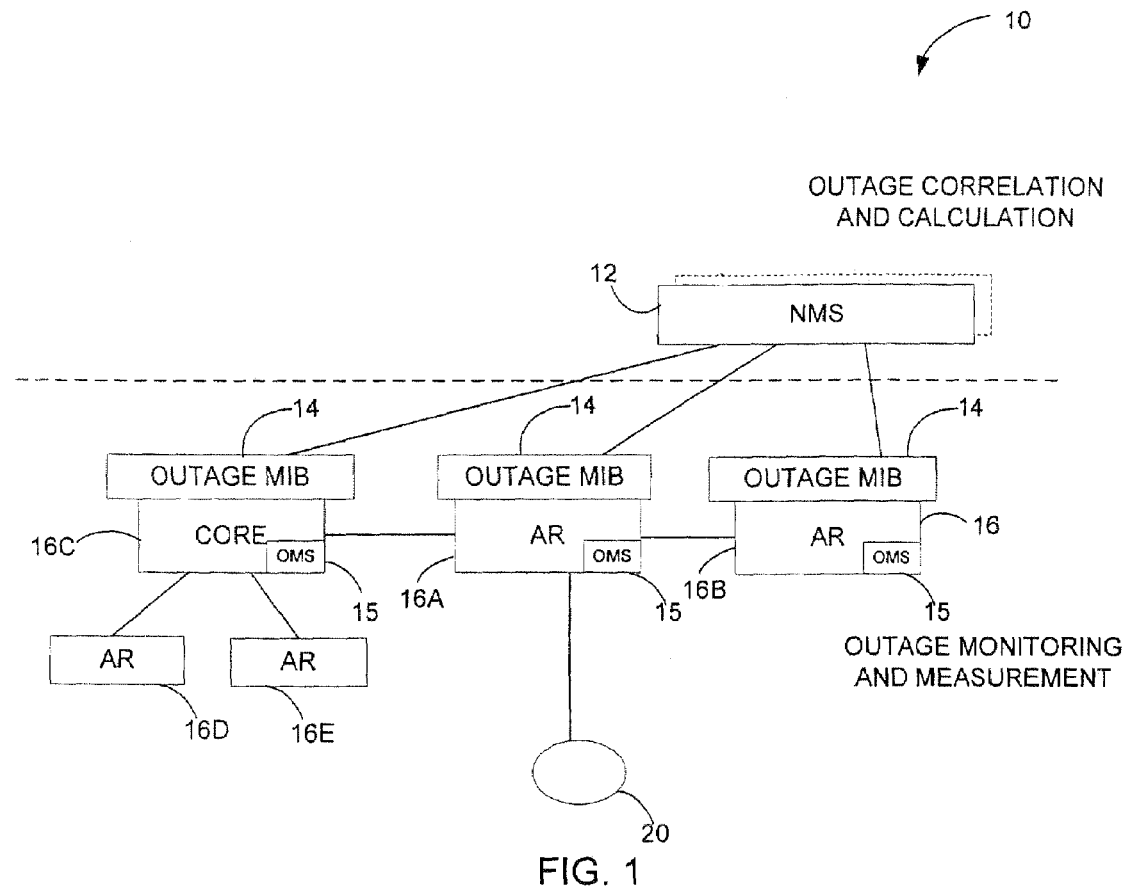
FIG. 1 is a diagram showing a network using an Outage Measurement System (OMS).

FIG. 1 shows an IP network 10 including one or more Outage Measurement Systems (OMSs) 15 located in different network processing devices 16. In one example, the network processing devices 16 are access routers 16A and 16B, switches or core routers 16C. However, these are just examples and the OMS 15 can be located in any network device that requires outage monitoring and measurement. Network Management System 12 is one or more servers or one or more other network processing devices located in network 10 that process the outage data generated by the OMSs 15.

Access router 16A is shown connected to customer equipment 20 and another access router 16B. The customer equipment 20 in this example is a router but can be any device used for connecting endpoints (not shown) to the IP network 10. The endpoints can be any personal computer, Local Area Network (LANs), T1 line, or any other device or interface that communicates over the IP network 10.

A core router 16C is shown coupled to access routers 16D and 16E. But core router 16C represents any network processing device that makes up part of the IP network 10. For simplicity, routers, core routers, switches, access routers, and other network processing devices are referred to below generally as "routers" or "network processing devices".

In one example, the OMS 15 is selectively located in network processing devices 16 that constitute single point of failures in network 10. A single point of failure can refer to any network processing device, link or interface that comprises a single path for a device to communicate over network 10. For example, access router 1 6A may be the only device available for customer equipment 20 to access network 10. Thus, the access router 16A can be considered a single point of failure for customer router 20.

The OMSs 15 in routers 16 conduct outage monitoring and measurements. The outage data from these measurements is then transferred to the NMS 12. The NMS 12 then correlates the outage data and calculates different outage statistics and values.

Figure 2:
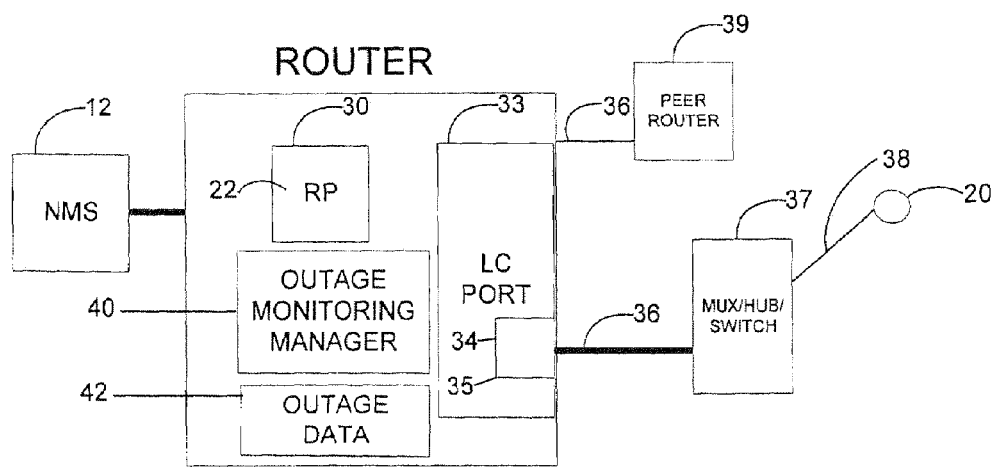
FIG. 2 is a block diagram showing some of the different outages that can be detected by the OMS.

FIG. 2 identifies outages that are automatically monitored and measured by the OMS 15. These different types of outages include a failure of the Router Processor (RP) 30. The RP failure can include a Denial OF Service (DOS) attack 22 on the processor 30. This refers to a condition where the processor 30 is 100% utilized for some period of time causing a denial of service condition for customer requests. The OMS 15 also detects failures of software processes that may be operating in network processing device.

The OMS 15 can also detect a failure of line card 33, a failure of one or more physical interfaces 34 (layer-2 outage) or a failure of one or more logical interfaces 35 (layer-3 outage) in line card 33. In one example, the logical interface 35 may include multiple T1 channels. The OMS 15 can also detect failure of a link 36 between either the router 16 and customer equipment 20 or a link 36 between the router 16 and a peer router 39. Failures are also detectable for a multiplexer (MUX), hub, or switch 37 or a link 38 between the MUX 37 and customer equipment 20. Failures can also be detected for the remote customer equipment 20.

An outage monitoring manager 40 in the OMS 15 locally monitors for these different failures and stores outage data 42 associated by with that outage monitoring and measurement. The outage data 42 can be accessed the NMS 12 or other tools for further correlation and calculation operations.

Figure 3:
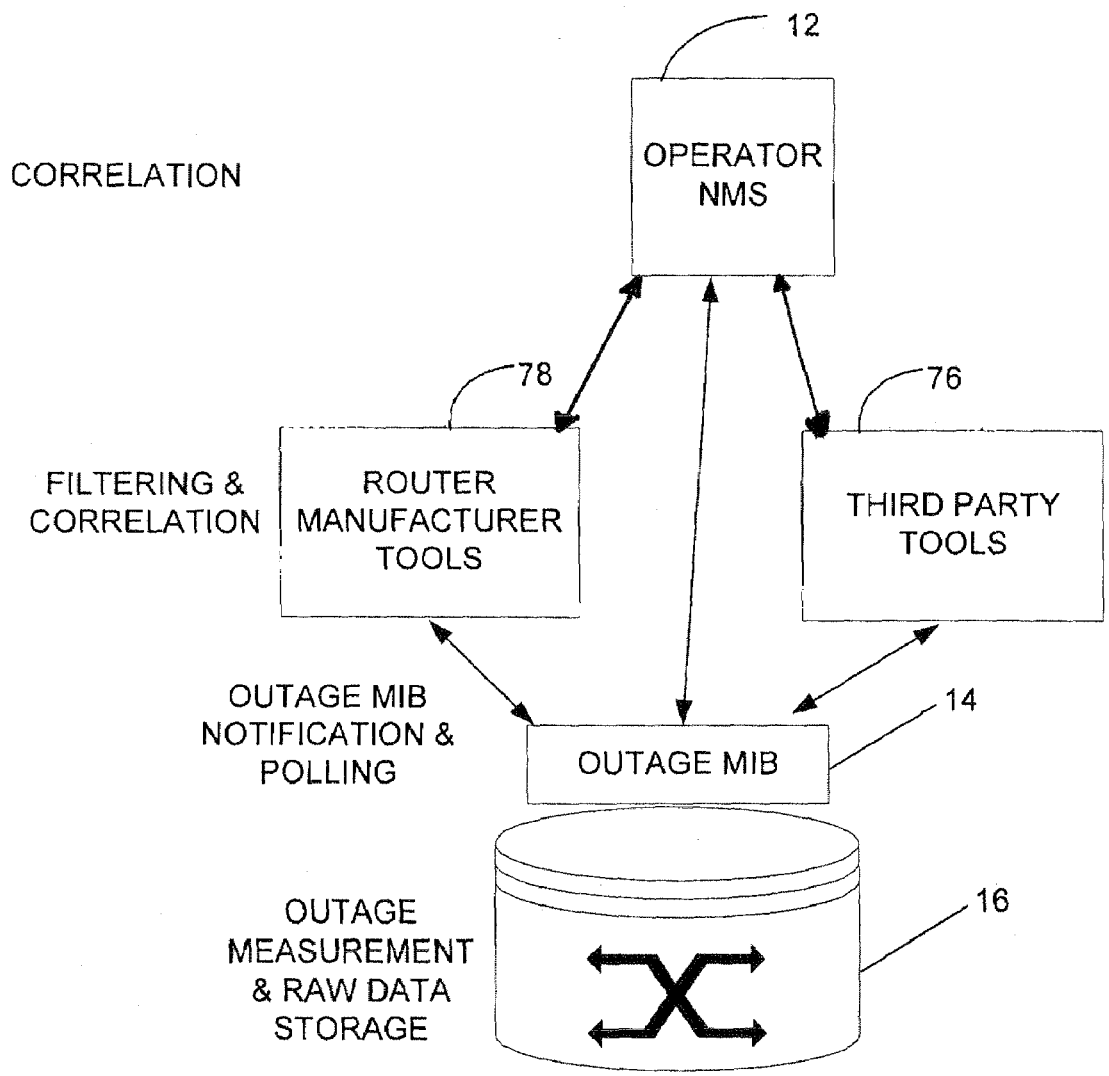
FIG. 3 is a block diagram showing how a multi-tiered scheme is used for outage measurement.

FIG. 3 shows how a hybrid two-tier approach is used for processing outages. A first tier uses the router 16 to autonomously and automatically perform local outage monitoring, measuring and raw outage data storage. A second tier includes router manufacturer tools 78, third party tools 76 and an NMS 12 that correlates and calculates outage values using the outage data in the router 16.

An outage Management Information Base (MIB) 14 provides open access to the outage data by the different filtering and correlation tools 76, 78 and NMS 12. The correlated outage information output by tools 76 and 78 can be used in combination with NMS 12 to identify outages. In an alternative embodiment, the NMS 12 receives the raw outage data directly from the router 16 and then does any necessary filtering and correlation. In yet another embodiment, some or all of the filtering and correlation is performed locally in the router 16, or another work station, then transferred to NMS 12.

Outage event filtering operations may be performed as close to the outage event sources as possible to reduce the processing overhead required in the IP network and reduce the system resources required at the upper correlation layer. For example, instead of sending failure indications for many logical interfaces associated with the same line card, the OMS 15 in router 16 may send only one notification indicating a failure of the line card. The outage data stored within the router 16 and then polled by the NMS 12 or other tools. This avoids certain data loss due to unreliable network transport, link outage, or link congestion.

The outage MIB 14 can support different tools 76 and 78 that perform outage calculations such as Mean Time Between Failure (MTBF), Mean Time To Repair (MTTR), and availability per object, device or network. The outage MIB 14 can also be used for customer Service Level Agreement (SLA) analysis.

Figure 4A:
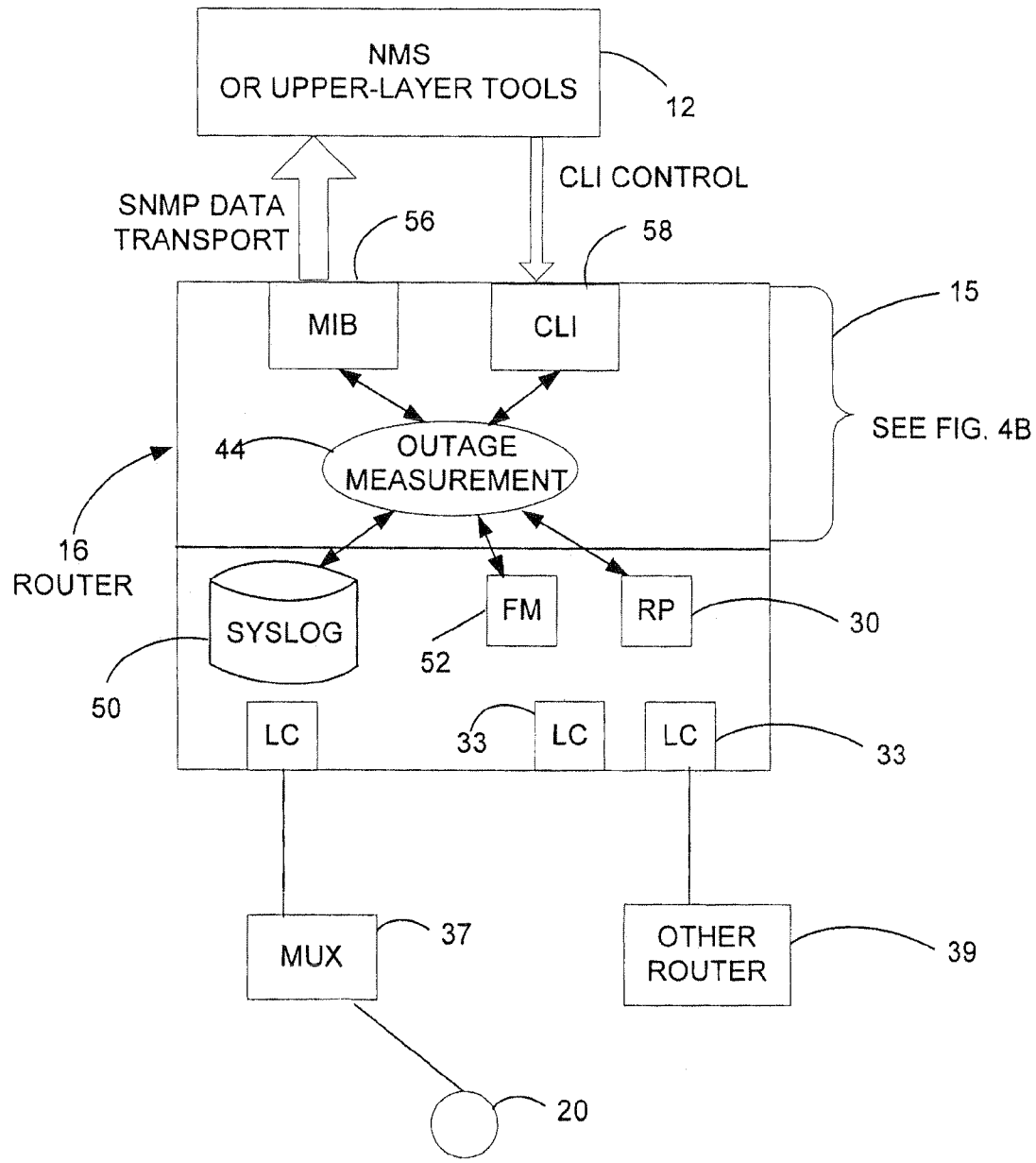
FIG. 4 is a detailed block diagram of the OMS.
Figure 4B:
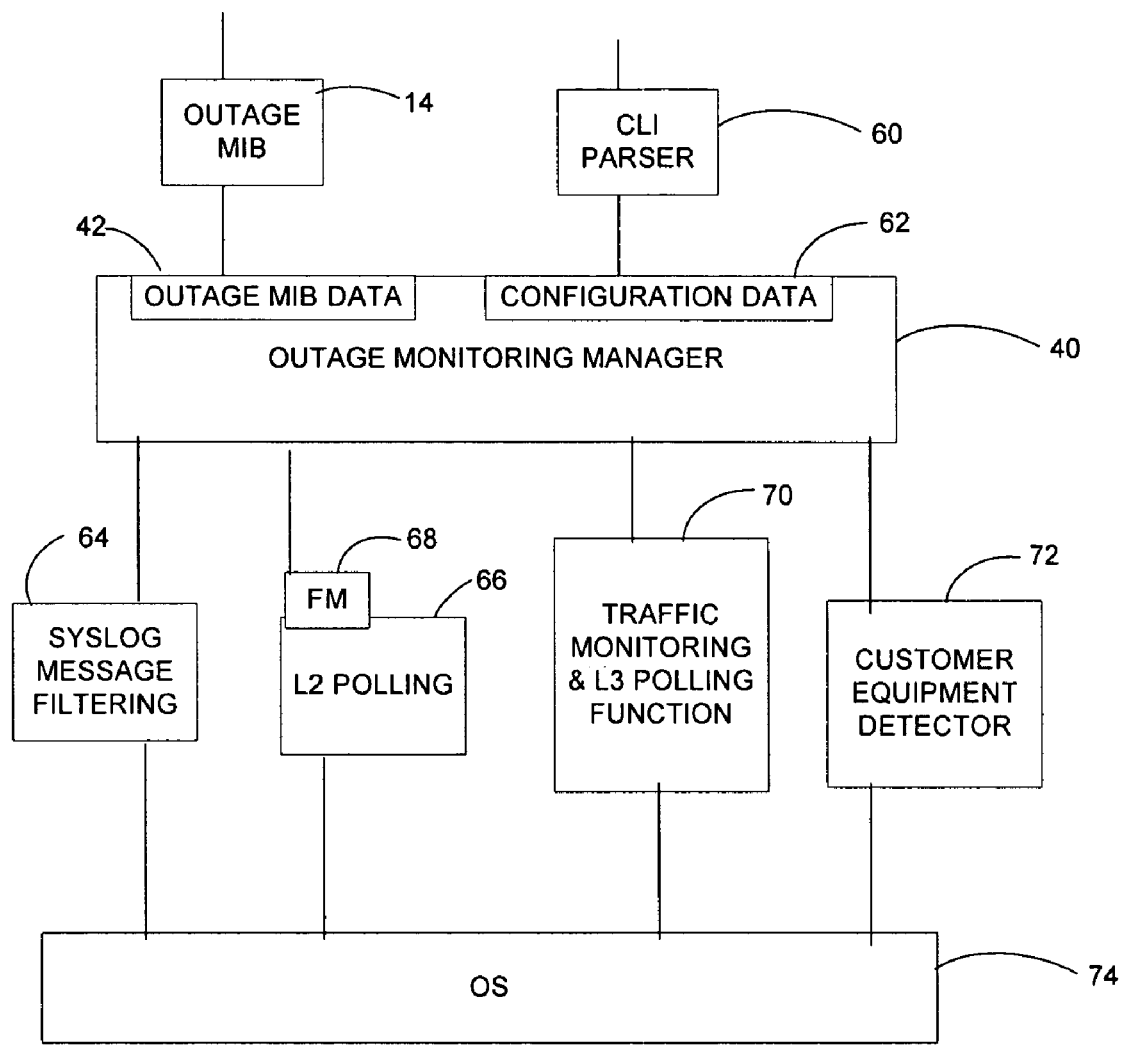

FIGS. 4A and 4B show the different functional elements of the OMS 15 operating inside the router 16. Outage measurements 44 are obtained from a router system log 50, Fault Manager (FM) 52, and router processor 30. The outage measurements 44 are performed according to configuration data 62 managed over a Command Line Interface 58. The CLI commands and configuration information is sent from the NMS 12 or other upper-layer outage tools. The outage data 42 obtained from the outage measurements 44 is managed and transferred through MIB 56 to the NMS 12 or other upper-layer tool.

The outage measurements 44 are controlled by an outage monitoring manager 40. The configuration data 62 is generated through a CLI parser 60. The MIB 56 includes outage MIB data 42 transferred using the outage MIB 14.

The outage monitoring manager 40 conducts system log message filtering 64 and Layer-2 (L2) polling 66 from the router Operating System (OS) 74 and an operating system fault manager 68. The outage monitoring manager 40 also controls traffic monitoring and Layer-3 (L3) polling 70 and customer equipment detector 72.

Outage MIB Data Structure

Figure 5:
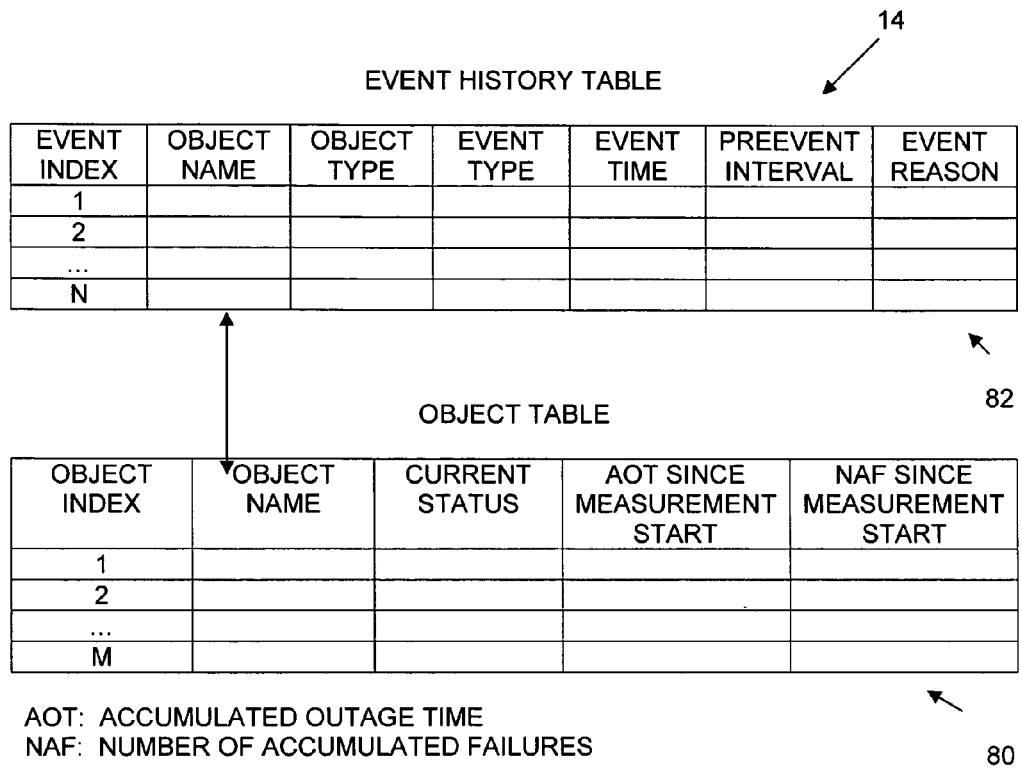
FIG. 5 shows an event history table and an object outage table used in the OMS.

FIG. 5 shows in more detail one example of the outage MIB 14 previously shown in FIG. 4. In one example, an object outage table 80 and an event history table 82 are used in the outage MIB 14. The outage MIB 14 keeps track of outage data in terms of Accumulated Outage Time (AOT) and Number of Accumulated Failures (NAF) per object.

The Outage MIB 14 maintains the outage information on a per-object basis so that the NMS 12 or upper-layer tools can poll the MIB 14 for the outage information for objects of interest. The number of objects monitored is configurable, depending on the availability of router memory and performance tradeoff considerations. Table 1.0 describes the parameters in the two tables 80 and 82 in more detail.

TABLE 1.0.

Outage MIB data structure

| Outage MIB variables | Table type | Description/Comment |
|---|---|---|
| Object Name | History/Object | This object contains the identification of the monitoring object. The object name is string. For example, the object name can be the slot number '3', controller name '3/0/0', serial interface name '3/0/0/2:0', or process ID. The name value must be unique. |
| Object Type | History | Represents different outage event object types. The types are defined as follows:<br>    routerObject: Bow level failure or recovery.<br>    rpslotObject: A route process slot failure or recovery.<br>    lcslotObject: A linecard slot failure or recovery.<br>    layer2InterfaceObject: A configured local interface failure or recovery. For example, controller or serial interface objects.<br>    layer3IPObject: A remote layer 3 protocol failure or recovery. Foe example, ping failure to the remote device.<br>    protocolSwObject: A protocol process failure or recovery, which causes the network outage. For example, BGP protocol process failure, while RP is OK. |
| Event Type | History | Object which identifies the event type such as failureEvent(1) or recoveryEvent(2). |
| Event Time | History | Object which identifies the event time. It uses the so-called 'UNIX format'. It is stored as a 32-bit count of seconds since 0000 UTC, 1 January, 1970." |
| Pre-Event Interval | History | Object which identifies the time duration between events. If the event is recovery, the interval time is TTR (Time To Recovery). If the event is failure, the interval time is TTF (Time To Failure). |
| Event Reason | History | Indicates potential reason(s) for an object up/down event. Such reasons may include, for example, Online Insertion Removal (OIR) and destination unreachable. |
| Current Status | Object | Indicates Current object's protocol status. interfaceUp(1) and interfaceDown(2) |
| AOT Since Measurement Start | Object | Accumulated Outage Time on the object since the outage measurement has been started. AOT is used to calculate object availability and DPM(Defects per Million) over a period of time. AOT and NAF are used to determine object MTTR(Mean Time To Recovery), MTBF(Mean Time Between Failure), and MTTF(Mean Time To Failure). |
| NAF Since Measurement Start | Object | Indicates Number of Accumulated Failures on the object since the outage measurement has been started. AOT and NAF are used to determine object MTTR(Mean Time To Recovery), MTBF(Mean Time Between Failure), and MTTF(Mean Time To Failure) |

An example of an object outage table 80 is illustrated in table 2.0. As an example, a "FastEthernet0/0/0" interface object is currently up. The object has 7-minutes of Accumulated Outage Time (AOT). The Number of Accumulated Failures (NAF) is 2.

TABLE 2.0

Object Outage Table

| Object Index | Object Name | Current Status | AOT Since Measurement Start | NAF Since Measurement Start |
|---|---|---|---|---|
| 1 | FastEthernet0/0/0 | Up | 7 | 2 |
| 2 | | | | |
| . | | | | |
| . | | | | |
| . | | | | |
| M | | | | |

AOT: Accumulated Outage Time
NAF: Number of Accumulated Failures

The size of the object outage table 80 determines the number of objects monitored. An operator can select which, and how many, objects for outage monitoring, based on application requirements and router resource (memory and CPU) constraints. For example, a router may have 10,000 customer circuits. The operator may want to monitor only 2,000 of the customer circuits due to SLA requirements or router resource constraints.

The event history table 82 maintains a history of outage events for the objects identified in the object outage table. The size of event history table 82 is configurable, depending on the availability of router memory and performance tradeoff considerations. Table 3.0 shows an example of the event history table 82. The first event recorded in the event history table shown in table 3.0 is the shut down of an interface object "Serial3/0/0/1:0" at time 13:28:05. Before the event, the interface was in an "Up" state for a duration of 525600 minutes.

TABLE 3.0

Event History Table in Outage MIB

| Event Index | Object Name | Object Type | Event Type | Event Time | PreEvent Interval | Event Reason |
|---|---|---|---|---|---|---|
| 1 | Serial3/0/0/1:0 | Serial | InterfaceDown | 13:28:05 | 525600 | Interface Shut |
| 2 | | | | | | |
| . | | | | | | |
| . | | | | | | |
| . | | | | | | |
| N | | | | | | |

The event history table 82 is optional and the operator can decide if the table needs to be maintained or not, depending on application requirements and router resource (memory and CPU) constraints.

Configuration

Figure 6:
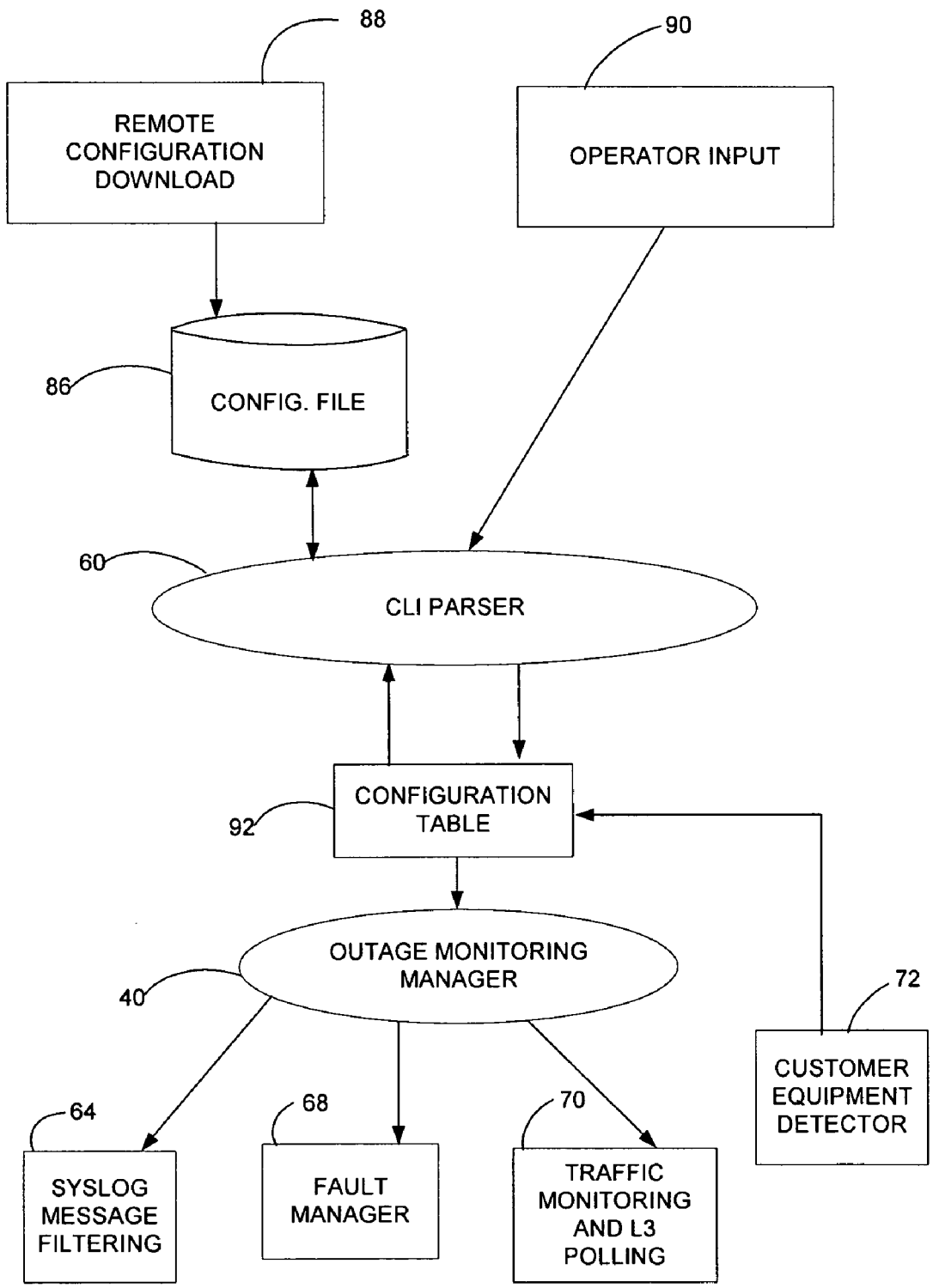
FIG. 6 shows how a configuration table and configuration file are used in the OMS.

FIG. 6 shows how the OMS is configured. The router 16 maintains a configuration table 92 which is populated either by a configuration file 86 from the NMS 12, operator inputs 90, or by customer equipment detector 72. The configuration table 92 can also be exported from the router 16 to the NMS 12.

Table 4.0 describes the types of parameters that may be used in the configuration table 92.

TABLE 4.0

Configuration Table Parameter Definitions

| Parameters | Definition |
|---|---|
| L2 Object ID | Object to be monitored |
| Process ID | SW process to be monitored |
| L3 Object ID | IP address of the remote customer device |
| Ping mode | Enabled/Disabled active probing using ping |
| Ping rate | Period of pinging the remote customer device |

The configuration file 86 can be created either by a remote configuration download 88 or by operator input 90. The CLI parser 60 interprets the CLI commands and configuration file 86 and writes configuration parameters similar to those shown in table 4.0 into configuration table 92.

Outage Management Commands

The operator input 90 is used to send commands to the outage monitoring manager 40. The operator inputs 90 are used for resetting, adding, removing, enabling, disabling and quitting different outage operations. An example list of those operations are described in table 5.0.

TABLE 5.0

Outage Management Commands

| Command | Explanation |
|---|---|
| start-file filename | start outage measurement process with configuration file |

TABLE 5.0-continued

Outage Management Commands

| Command | Explanation |
|---|---|
| start-default | start outage measurement process without configuration file |
| add object | add an object to the outage measurement entry |
| group-add filename | add multiple objects with configuration file |
| remove object | remove an object from the outage measurement entry |
| group-remove filename | remove multiple objects with configuration file |
| ping-enable objectID/all rate period | enable remote customer device ping with period |
| ping-disable objectID/all | disable remote customer device ping |
| auto-discovery enable | enable customer device discovery function |
| auto-discovery disable | disable customer device discovery function |
| export filename | export current entry table to the configuration file |
| Quit | stop outage measurement process |

Figure 7:
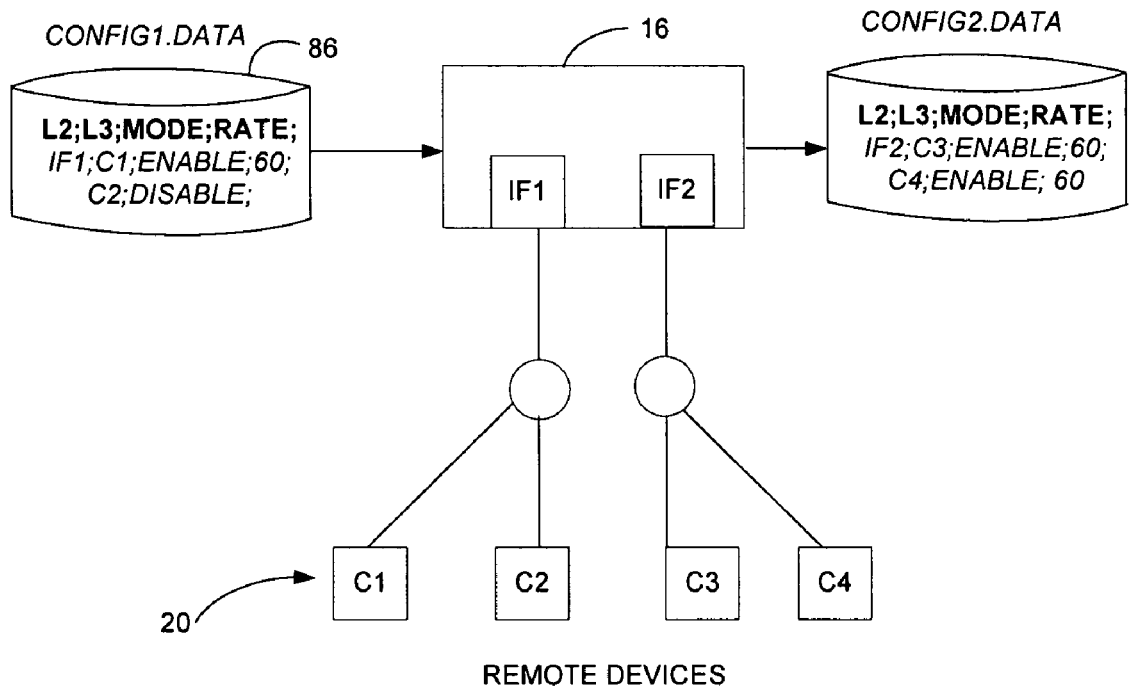
FIG. 7 shows one example of how commands are processed by the OMS.

FIG. 7 shows an example of how the outage management commands are used to control the OMS 15. A series of commands shown below are sent from the NMS 12 to the OMS 15 in the router 16.

(1) start-file config1.data;

(2) add IF2;

(3) auto-discovery enable;

(4) ping-enable all rate 60;

(5) remove IF1; and (6) export config2.data

In command (1), a start file command is sent to the router 16 along with a configuration file 86. The configuration file 86 directs the outage monitoring manager 40 to start monitoring interface IF1 and enables monitoring of remote customer router C1 for a 60 second period. The configuration file 86 also adds customer router C2 to the configuration table 92 (FIG. 6) but disables testing of router C2.

In command (2), interface IF2 is added to the configuration table 92 and monitoring is started for interface IF2. Command (3) enables an auto-discovery through the customer equipment detector 72 shown in FIG. 6. Customer equipment detector 72 discovers only remote router devices C3 and C4 connected to router 16 and adds them to the configuration table 92. Monitoring of customer routers C3 and C4 is placed in a disable mode. Auto-discovery is described in further detail below.

Command (4) initiates a pinging operation to all customer routers C1, C2, C3 and C4. This enables pinging to the previously disabled remote routers C2, C3, and C4. Command (5) removes interface IF1 as a monitoring entry from the configuration table 92. The remote devices C1 and C2 connected to IF1 are also removed as monitoring entries from the configuration table 92. Command (6) exports the current entry (config2.data) in the configuration file 86 to the NMS 12 or some other outage analysis tool. This includes layer-2 and layer-3, mode, and rate parameters.

Automatic Customer Equipment Detection.

Referring back to FIG. 6, customer equipment detector 72 automatically searches for a current configuration of network devices connected to the router 16. The identified configuration is then written into configuration table 92. When the outage monitoring manager 40 is executed, it tries to open configuration table 92. If the configuration table 92 does not exist, the outage monitoring manager 40 may use customer equipment detector 72 to search all the line cards and interfaces in the router 16 and then automatically create the configuration table 92. The customer equipment detector 72 may also be used to supplement any objects already identified in the configuration table 92. Detector 72 when located in a core router can be used to identify other connected core routers, switches or devices.

Any proprietary device identification protocol can be used to detect neighboring customer devices. If a proprietary protocol is not available, a ping broadcast can be sued to detect neighboring customer devices. Once customer equipment detector 72 sends a ping broadcast request message to adjacent devices within the subnet, the neighboring devices receiving the request send back a ping reply message. If the source address of the ping reply message is new, it will be stored as a new remote customer device in configuration table 92. This quickly identifies changes in neighboring devices and starts monitoring customer equipment before the updated static configuration information becomes available from the NMS operator.

The customer equipment detector 72 shown in FIGS. 4 and 6 can use various existing protocols to identify neighboring devices. For example, a Cisco Discovery Protocol (CDP), Address Resolution Protocol (ARP) protocol, Internet Control Message Protocol (ICMP) or a traceroute can be used to identify the IP addresses of devices attached to the router 16. The CDP protocol can be used for Cisco devices and a ping broadcast can be used for non-Cisco customer premise equipment.

Layer-2 Polling

Referring to FIGS. 4 and 6, a Layer-2 (L2) polling function 66 polls layer-2 status for local interfaces between the router 16 and the customer equipment 20. Layer-2 outages in one example are measured by collecting UP/DOWN interface status information from the syslog 50. Layer-2 connectivity information such as protocol status and link status of all customer equipment 20 connected to an interface can be provided by the router operating system 74.

If the OS Fault Manger (FM) 68 is available on the system, it can detect interface status such as "interface UP" or "interface DOWN". The outage monitoring manager 40 can monitor this interface status by registering the interface ID. When the layer-2 polling is registered, the FM 68 reports current status of the interface. Based on the status, the L2 interface is registered as either "interface UP" or "interface DOWN" by the outage monitoring manager 310.

If the FM 68 is not available, the outage monitoring manager 40 uses its own layer-2 polling 66. The outage monitoring manager 40 registers objects on a time scheduler and the scheduler generates polling events based on a specified polling time period. In addition to monitoring layer-2 interface status, the layer-2 polling 66 can also measure line card failure events by registering the slot number of the line card 33.

Layer-3 Polling

In addition to checking layer-2 link status, layer-3 (L3) traffic flows such as "input rate", "output rate", "output queue packet drop", and "input queue packet drop" can optionally be monitored by traffic monitoring and L3 polling function 70. Although layer-2 link status of an interface may be "up", no traffic exchange for an extended period of time or dropped packets for a customer device, may indicate failures along the path.

Two levels of layer-3 testing can be performed. A first level identifies the input rate, output rate and output queue packet drop information that is normally tracked by the router operating system 74. However, low packets rates could be caused by long dormancy status. Therefore, an additional detection mechanism such as active probing (ping) is used in polling function 70 for customer devices suspected of having layer-3 outages. During active probing, the OMS 15 sends test packets to devices connected to the router 16. This is shown in more detail in FIG. 1A.

The configuration file 86 (FIG. 6) specifies if layer-3 polling takes place and the rate in which the ping test packets are sent to the customer equipment 20. For example, the ping-packets may be sent wherever the OS 74 indicates no activity on a link for some specified period of time. Alternatively, the test packets may be periodically sent from the access router 16 to the customer equipment 20. The outage monitoring manager 40 monitors the local link to determine if the customer equipment 20 sends back the test packets.

Outage Monitoring Examples

The target of outage monitoring is referred to as "object", which is a generalized abstraction for physical and logical interfaces local to the router 16, logical links in-between the router 16, customer equipment 20, peer routers 39 (FIG. 2), remote interfaces, linecards, router processor(s), or software processes.

The up/down state, Accumulated Outage Time since measurement started (AOT); and Number of Accumulated Failures since measurement started (NAF) object states are monitored from within the router 16 by the outage monitoring manager 40. The NMS 12 or higher-layer tools 78 or 76 (FIG. 3) then use this raw data to derive and calculate information such as object Mean Time Between Failure (MTBF), Mean Time To Repair (MTTR), and availability. Several application examples are provided below.

Figure 8:
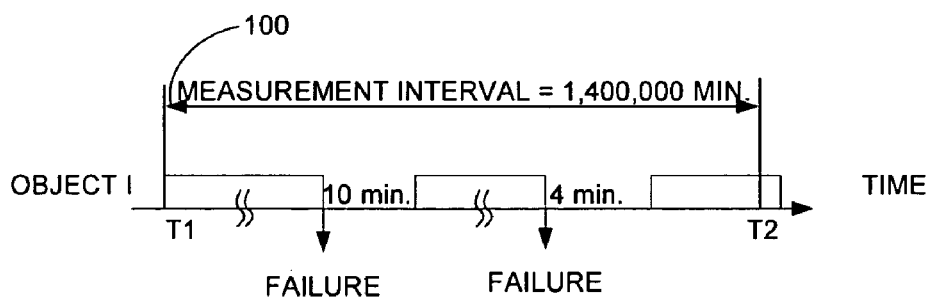
FIG. 8 shows how an Accumulated Outage Time (AOT) is used for outage measurements.

Referring to FIG. 8, the outage monitoring manager 40 measures the up or down status of an object for some period from time T1 to time T2. In this example, the period of time is 1,400,000 minutes. During this time duration, the outage monitoring manager 40 automatically determines the duration of any failures for the monitored object. Time to Repair (TTR), Time Between Failure (TBF), and Time To Failure (TTF) are derived by the outage monitoring manager 40.

In the example in FIG. 8, a first outage is detected for object i that lasts for 10 minutes and a second outage is detected for object i that lasts 4 minutes. The outage monitoring manager 40 in the router 16 calculates the AOTi=10 minutes+4 minutes=14 minutes. The AOT information is transferred to the NMS 12 or higher level tool that then calculates the object Availability (Ai) and Defects Per Million (DPM). For example, for a starting time T1 and ending time T2, the availability Ai=1−AOTi/(T2−T1)=1−14/1,400,000=99.999%. The DPMi=[AOTi/(T2−T1)]× $10^6$=10 DPM.

There are two different ways that the outage monitoring manager 40 can automatically calculate the AOTi. In one scheme, the outage monitoring manager 40 receives an interrupt from the router operating system 74 (FIG. 4) each time a failure occurs and another interrupt when the object is back up. In a second scheme, the outage monitoring manager 40 constantly polls the object status tracking for each polling period whether the object is up or down.

Figure 9:
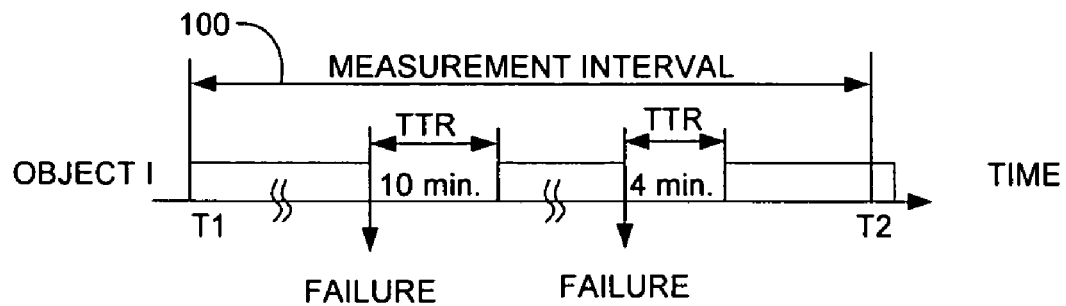
FIG. 9 shows how a Number of Accumulated Failures (NAF) is used for outage measurements.

FIG. 9 shows one example of how the Mean Time To Repair (MTTR) is derived by the NMS 12 for an object i. The outage monitoring manager 40 counts the Number of Accumulated Failures (NAFi) during a measurement interval 100. The AOTi and NAFi values are transferred to the NMS 12 or higher level tool. The NMS 12, or a higher level tool, then calculates MTTRi=AOTi/NAFi=14/2=7 min.

Figure 10:
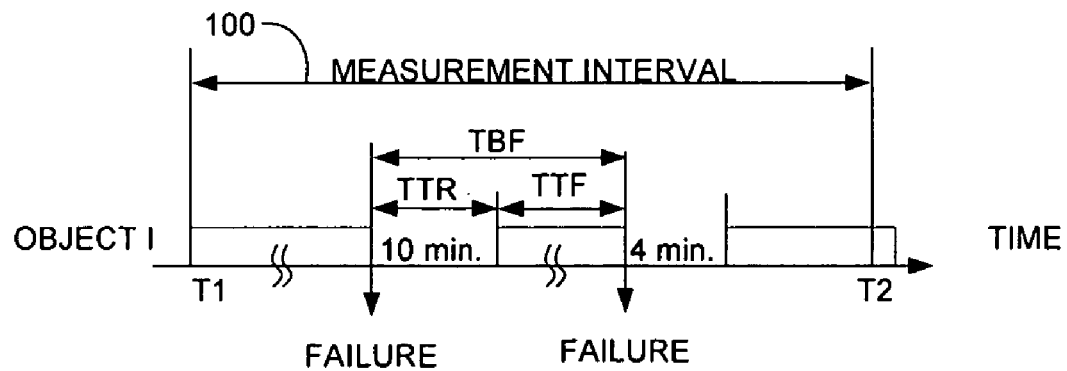
FIG. 10 shows how a Mean Time Between Failures (MTBF) and a Mean Time To Failure (MTTF) are calculated from OMS outage data.

FIG. 10 shows how the NMS 12 or higher level tool uses AOT and NAF to determine the Mean Time Between Failure (MTBF) and Mean Time To Repair (MTTF) for the object i from the NAFi information where;

MTBFi=(T2−T1)/NAFi; and

MTTFi=MTBFi−MTTRi.

Figure 11A:
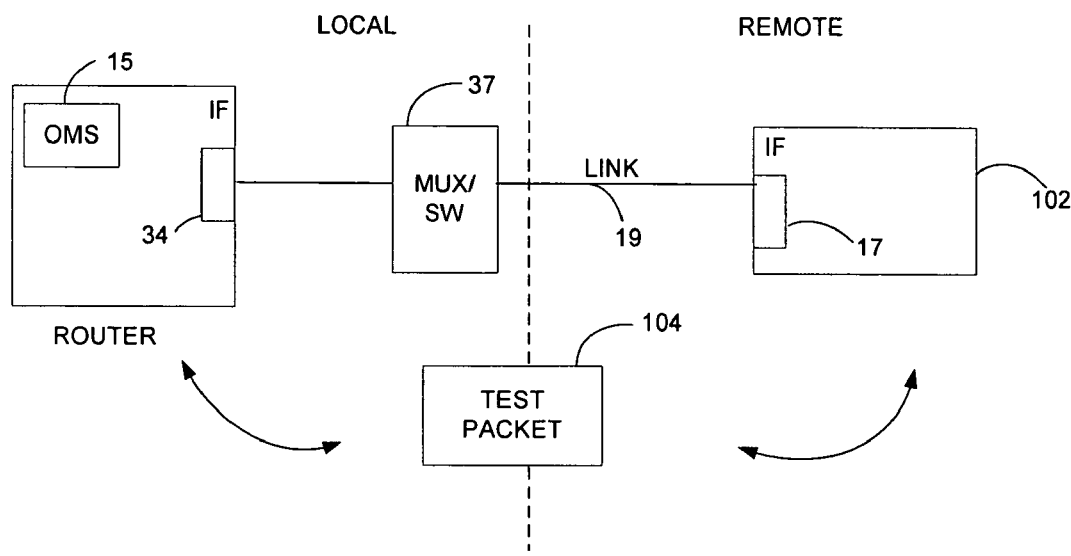
FIGS. 11A and 11B show how local outages are distinguished from remote outages.

A vendor or network processing equipment or the operator of network processing equipment may be asked to sign a Service Level Agreement (SLA) guaranteeing the network equipment will be operational for some percentage of time. FIG. 11A shows how the AOT information generated by the outage monitoring manager 40 is used to determine if equipment is meeting SLA agreements and whether local or remote equipment is responsible for an outage.

In FIG. 11A, the OMS 15 monitors a local interface object 34 in the router 16 and also monitors the corresponding remote interface object 17 at a remote device 102. The remote device 102 can be a customer router, peer router, or other network processing device. The router 16 and the remote device 102 are connected by a single link 19.

Figure 11B:
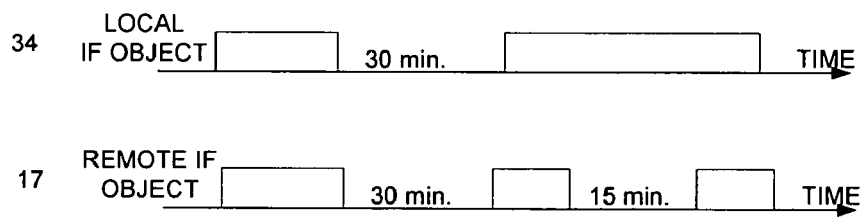

In one example, the local interface object 34 can be monitored using a layer-2 polling of status information for the physical interface. In this example, the remote interface 17 and remote device 102 may be monitored by the OMS 15 sending a test packet 104 to the remote device 102. The OMS 15 then monitors for return of the test packet 104 to router 16. The up/down durations of the local interface object 34 and its corresponding remote interface object 17 are shown in FIG. 11B.

The NMS 12 correlates the measured AOT's from the two objects 34 and 17 and determines if there is any down time associated directly with the remote side of link 19. In this example, the $AOT_{34}$ of the local IF object 34=30 minutes and the $AOT_{17}$ of the remote IF object 17=45 minutes. There is only one physical link 19 between the access router 16 and the remote device 102. This means that any outage time beyond the 30 minutes of outage time for IF 34 is likely caused by an outage on link 19 or remote device 102. Thus, the NMS 12 determines the AOT of the remote device 102 or link 19=(AOT remote IF object 17)−(AOT local IF object 34)=15 minutes.

It should be understood, that IF 34 in FIG. 11A may actually have many logical links coupled between itself and different remove devices. The OMS 15 can monitor the status for each logical interface or link that exists in router 16. By only pinging test packets 104 locally between the router 16 and its neighbors, there is much less burden on the network bandwidth.

Potential reason(s) for an object up/down event may be logged and associated with the event. Such reasons may include, for example, Online Insertion Removal (OIR) and destination unreachable.

Event Filtering

Simple forms of event filtering can be performed within the router 16 to suppress "event storms" to the NMS 12 and to reduce network/NMS resource consumption due to the event storms. One example of an event storm and event storm filtering may relate to a line card failure. Instead of notifying the NMS 12 for tens or hundreds of events of channelized interface failures associated with the same line card, the outage monitoring manager 40 may identify all of the outage events with the same line card and report only one LC failure event to the NMS 12. Thus, instead of sending many failures, the OMS 15 only sends a root cause notification. If the root-cause event needs to be reported to the NMS 12, event filtering would not take place. Event filtering can be rule-based and defined by individual operators.

Resolution

Resolution refers to the granularity of outage measurement time. There is a relationship between the outage time resolution and outage monitoring frequency when a polling-based measurement method is employed. For example, given a one-minute resolution of customer outage time, the outage monitoring manager 40 may poll once every 30 seconds. In general, the rate of polling for outage monitoring shall be twice as frequent as the outage time resolution. However, different polling rates can be selected depending on the object and desired resolution.

Pinging Customer or Peer Router Interface

As described above in FIG. 11A, the OMS 15 can provide a ping function (sending test packets) for monitoring the outage of physical and logical links between the measuring router 16 and a remote device 102, such as a customer router or peer router. The ping function is configurable on a per-object basis so the user is able to enable/disable pinging based on the application needs.

The configurability of the ping function can depend on several factors. First, an IP Internet Control Message Protocol (ICMP) ping requires use of the IP address of the remote interface to be pinged. However, the address may not always be readily available, or may change from time to time. Further, the remote device address may not be obtainable via such automated discovery protocols, since the remote device may turn off discovery protocols due to security and/or performance concerns. Frequent pinging of a large number of remote interfaces may also cause router performance degradation.

To avoid these problems, pinging may be applied to a few selected remote devices which are deemed critical to customer's SLA. In these circumstances, the OMS 15 configuration enables the user to choose the Ping function on a per-object basis as shown in table 4.0.

Certain monitoring mechanisms and schemes can be performed to reduce overhead when the ping function is enabled. Some of these basic sequences include checking line card status, checking physical link integrity, checking packet flow statistics. Then, if necessary, pinging remote interfaces at remote devices. With this monitoring sequence, pinging may become the last action only if the first three measurement steps are not properly satisfied.

Outage Data Collection

Figure 12:
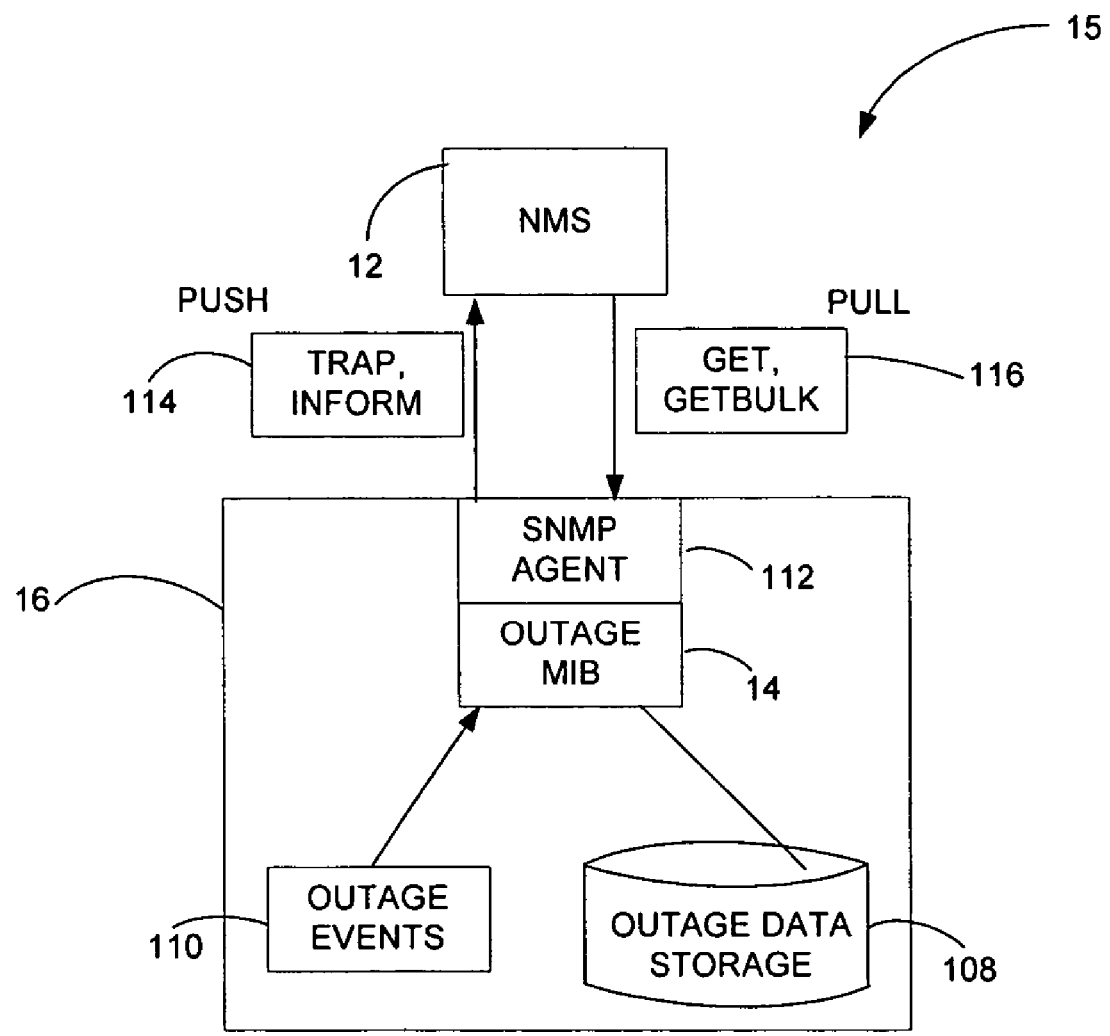
FIG. 12 shows how outage data is transferred to a Network Management System (NMS).

Referring to FIG. 12, the OMS 15 collects measured outage data 108 for the NMS 12 or upper-layer tools 76 or 78 (FIG. 3). The OMS 15 can provide different data collection functions, such as event-based notification, local storage, and data access.

The OMS 15 can notify NMS 12 about outage events 110 along with associated outage data 108 via a SNMP-based "push" mechanism 114. The SNMP can provide two basic notification functions, "trap" and "inform" 114. Of course other types of notification schemes can also be used. Both the trap and inform notification functions 114 send events to NMS 12 from an SNMP agent 112 embedded in the router 16. The trap function relies on an User Datagram Protocol (UDP) transport that may be unreliable. The inform function uses an UDP in a reliable manner through a simple request-response protocol.

Through the Simple Network Management Protocol (SNMP) and MIB 14, the NMS 12 collects raw outage data either by event notification from the router 16 or by data access to the router 16. With the event notification mechanism, the NMS 12 can receive outage data upon occurrence of outage events. With the data access mechanism, the NMS 12 reads the outage data 108 stored in the router 16 from time to time. In other words, the outage data 108 can be either pushed by the router 16 to the NMS 12 or pulled by the NMS 12 from the router 16.

The NMS 12 accesses, or polls, the measured outage data 108 stored in the router 16 from time to time via a SNMP-based "pull" mechanism 116. SNMP provides two basic access functions for collecting MIB data, "get" and "getbulk". The get function retrieves one data item and the getbulk function retrieves a set of data items.

Measuring Router Crashes

Figure 13:
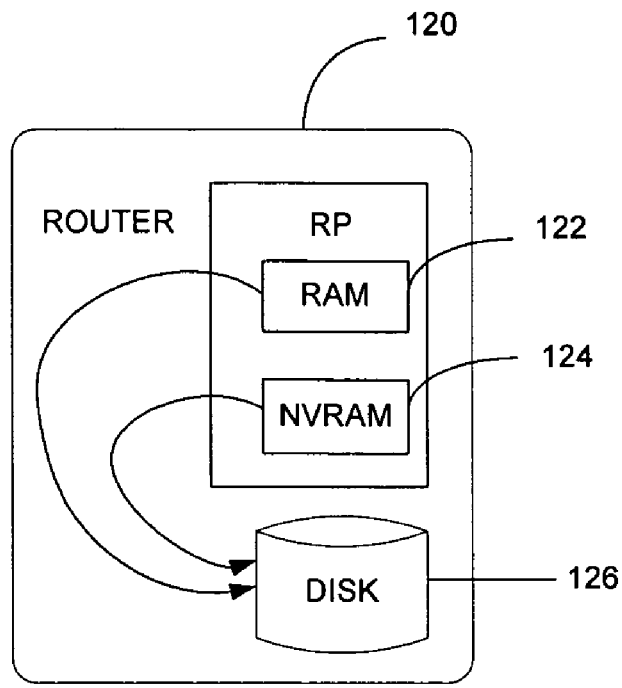
FIG. 13 is a diagram showing how router processor-to-disk check pointing is performed by the OMS.

Referring to FIG. 13, the OMS 15 can measure the time and duration of "soft" router crashes and "hard" router crashes. The entire router 120 may crash under certain failure modes. A "Soft" router crash refers to the type of router failures, such as a software crash or parity error-caused crash, which allows the router to generate crash information before the router is completely down. This soft crash information can be produced with a time stamp of the crash event and stored in the non-volatile memory 124. When the system is rebooted, the time stamp in the crash information can be used to calculate the router outage duration.

"Hard" router crashes are those under which the router has no time to generate crash information. An example of hard crash is an instantaneous router down due to a sudden power loss. One approach for capturing the hard crash information employs persistent storage, such as non-volatile memory 124 or disk memory 126, which resides locally in the measuring router 120.

With this approach, the OMS 15 periodically writes system time to a fixed location in the persistent storage 124 or 126. For example, every minute. When the router 120 reboots from a crash, the OMS 15 reads the time stamp from the persistent storage device 124 or 126.

The router outage time is then within one minute after the stamped time. The outage duration is then the interval between the stamped time and the current system time.

This eliminates another network processing device from having to periodically ping the router 120 and using network bandwidth. This method is also more accurate than pinging, since the internally generated time stamp more accurately represents the current operational time of the router 120.

Another approach for measuring the hard crash has one or more external devices periodically poll the router 120. For example, NMS 12 (FIG. 1) or neighboring router(s) may ping the router 120 under monitoring every minute to determine its availability.

Local Storage

The outage information can also be stored in redundant memory 124 or 126, within the router 120 or at a neighboring router, to avoid the single point of storage failure. The outage data for all the monitored objects, other than router 120 and the router processor object 121, can be stored in volatile memory 122 and periodically polled by the NMS.

The outage data of all the monitored objects, including router 120 and router processor objects 121, can be stored in either the persistent non-volatile memory 124 or disk 126, when storage space and run-time performance permit.

Storing outage information locally in the router 120 increases reliability of the information and prevents data loss when there are outages or link congestion in other parts of the network. Using persistent storage 124 or 126 to store outage information also enables measurement of router crashes.

When volatile memory 122 is used for outage information storage, the NMS or other devices may poll the outage data from the router 120 periodically, or on demand, to avoid outage information loss due to the failure of the volatile memory 122 or router 120. The OMS 15 can use the persistent storage 124 or 126 for all the monitored objects depending on size and performance overhead limits.

Dual-Router Processor Checkpointing

Figure 14:
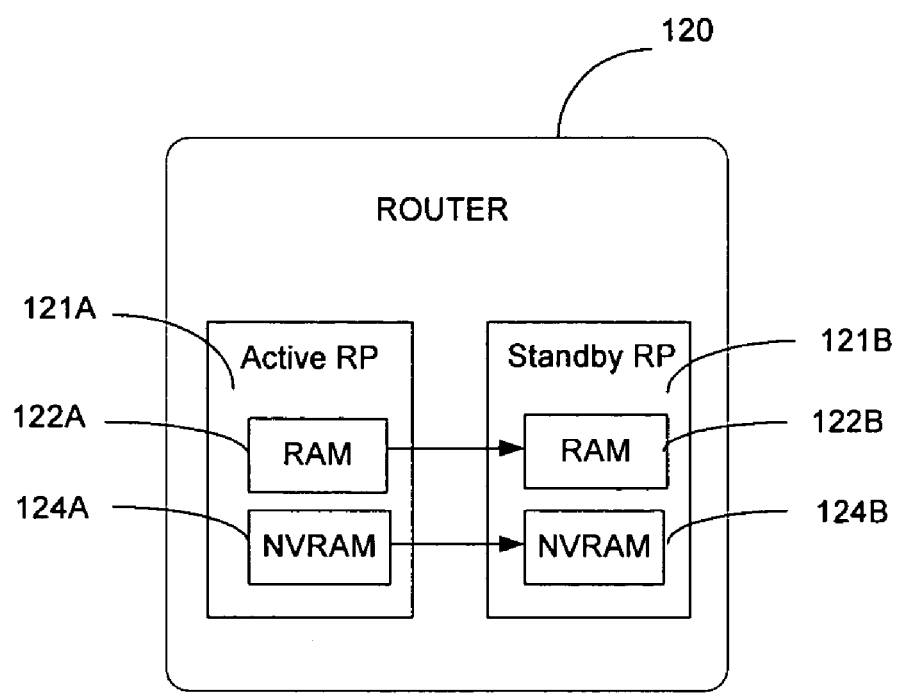
FIG. 14 is a diagram showing how router processor-to-router processor check pointing is performed by the OMS.

Referring to FIG. 14, some routers 120 may be configured with dual processors 121A and 121B. The OMS 15 may replicate the outage data from the active router processor storage 122A or 124A (persistent and non-persistent) to the standby storage 122B or 124B (persistent and non-persistent) for the standby router processor 121B during outage data updates.

This allows the OMS 15 to continue outage measurement functions after a switchover from the active processor 121A to the standby processor 121B. This also allows the router 120 to retain router crash information even if one of the processors 121A or 121B containing the outage data is physically replaced.

Outage Measurement Gaps

The OMS 15 captures router crashes and prevents loss of outage data to avoid outage measurement gaps. The possible outage measurement gaps are governed by the types of objects under the outage measurement. For example, a router processor (RP) object vs. other objects. Measurement gaps are also governed by the types of router crashes (soft vs. hard) and the types of outage data storage (volatile vs. persistent-nonvolatile memory or disk).

Table 6 summarizes the solutions for capturing the router crashes and preventing measurement gaps.

TABLE 6

Capturing the Outage of Router Crashes

| Events | When Volatile Memory Employed for objects other than RPs | When Persistent Storage Employed | |
|---|---|---|---|
| | | for Router Processor (RP) objects only | for all the objects |
| Soft router crash | NMS polls the stored outage data periodically or on demand. | (1) IOS generates "Crashinfo" with the router outage time. The Crashinfo is stored in non-volatile storage. Or, (2) OMS periodically writes system time to a persistent storage device to record the latest "I'm alive" time. | For the router and RP objects, OMS periodically writes system time to the persistent storage. For all the other objects, OMS writes their outage data from RAM to the persistent storage up on outage events. |
| Hard router crash | | (1) OMS periodically writes system time to a persistent storage device to record the latest "I'm alive" time. Or, (2) NMS or other routers periodically ping the router to assess its availability. | |

Even if a persistent storage device is used, the stored outage data could potentially be lost due to single point of failure or replacement of the storage device. Redundancy is one approach for addressing the problem. Some potential redundancy solutions include data check pointing from the memory on the router processor to local disk (FIG. 13), data check pointing from the memory on the active router processor to the memory on the standby router processor (FIG. 14), or data check pointing from the router 120 to a neighboring router.

Software Reliability Measurement and Classification

Another aspect of the invention automatically measures and classifies software failures. This aspect of the invention automatically measures kernel software outages caused by unplanned failures, kernel software outages caused by operational events, and planned kernel software outages due to maintenance and upgrade operations.

Kernal software outages refer to operating system type software outages that can crash the entire network processing device. Other types of software outages, such as outages associated with particular software applications or software protocols may not disable the entire network processing device but only the particular operation that is being performed by that particular software application. However, the invention can be applicable to any type of software outages.

Figure 15:
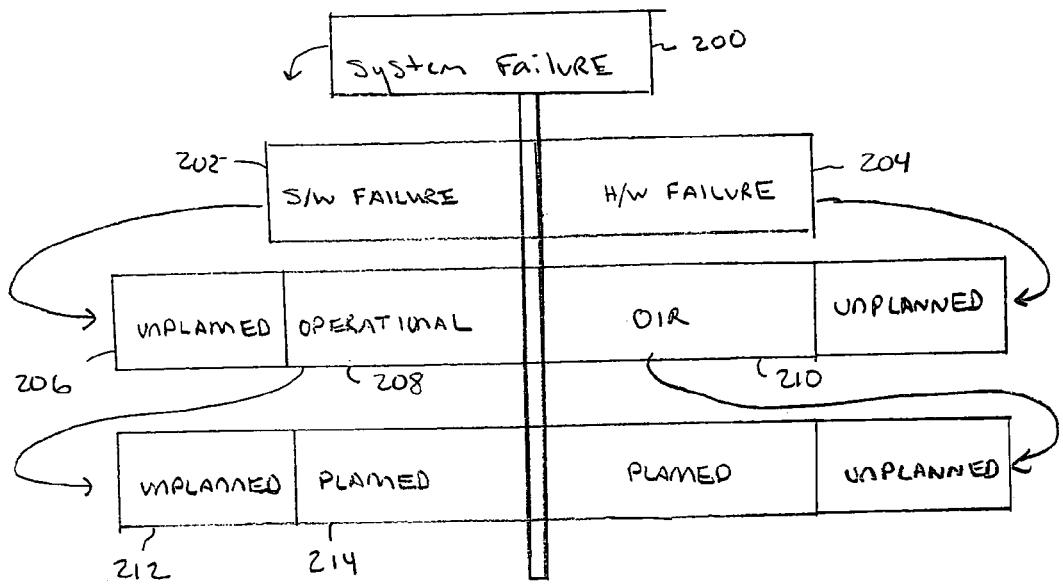
FIG. 15 is a chart showing how outages are categorized according to another aspect of the invention.

Referring to FIG. 15, a system failure 200 in a network processing device is automatically categorized as either a software-caused failure 202 or a hardware-caused failure 204. Software failures 202 are further classified as unplanned outages 206 or operational outages 208. Hardware outages can further be classified as Online Insertion Removal (OIR) outages 210. The operational outages 208 are further classified as unplanned operational outages 212 or planned operational outages 214.

A hardware type of outage 204 is associated with some type of failure in the network processing device hardware. Symptoms for hardware type outages 204 include hard crashes where there is no chance to store crash information. However, it is also possible that crash information can be generated during a hardware outage. Reasons for hardware crashes can include power failures, physical failures, hardware bus errors, memory corruption, etc.

A software type of outage 202 involves a crash caused by software where crash information can be stored. Reasons for software type crashes include software caused bus errors, address errors, floating point errors, arithmetic overflow errors, etc.

An operational type outage 208 is manually initiated by a system administrator generating for example, a reset, reload, or processor-switch-over command. Operational type outages 208 are classified as planned 214 or unplanned 212. An unplanned operational outage 212 can include "process hangs" where the network processing device requires a manual reset. In an unplanned operational outage 212, the network processing device does not automatically restart or switch-over to a backup routing processor. Reasons for unplanned operational outages 212 include deadlocks, undetected memory problems, latent failures, etc.

A planned operational outage 214 includes instances when a system administrator disables the network processing device for maintenance or administrative purposes even though the network processing device may be operating satisfactorily. Types of planned operational outages include manual software reloads and manual routing processor switch-overs.

Software in the network processing device intercepts and stores crash times for failure events and reasons (e.g., exception codes) in a persistent storage device during the system failure. At the time of system restart, this stored crash data is categorized into the different types of software outages specified above. Information such as Accumulated Outage Time (AOT) and Number of Accumulated Failures (NAF) can then be derived for the different categories of outage data. The AOT and NAF data can be further used for the calculation of software MTBF and software availability in the customer's network management system.

Figure 16:
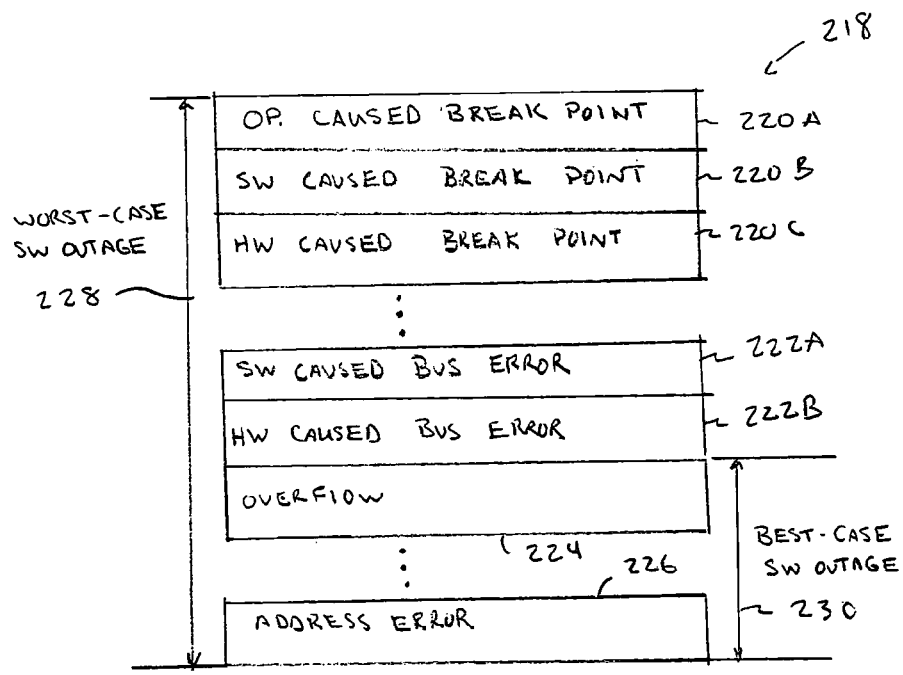
FIG. 16 is a chart showing how software outages are classified as best case and worse case software outages.

Referring to FIG. 16, exception errors 218 are automatically generated by operating system software, for example, by the IOS software that operates a network processing device. There are gray areas in these exception errors 218. Grey areas refer to network processing device outages that could be attributed to hardware or software faults.

For example, a break point error 220 could be caused by an operational event 220A, software event 220B, or a hardware event 220C. A bus error 222 could be caused by a software event 222A or a hardware event 222B. However, an overflow error 224 or an address error 226 can only be attributed to software events.

A break point error refers to an error generated whenever the operating system software reaches a certain point in a program or detects a particular event. The break point errors are automatically generated by the operating system software generally right before the network processing device crashes. A bus error can refer to problems associated with transferring data over a network cable. Bus errors can be the result of a physical problem with the network cable or connection or alternatively can be the result of a problem with driver software. An overflow error refers to an illegal data or address value, such as infinity. An address error refers to an illegal address. Overflow errors and address errors are only caused by software.

In order to cope with the ambiguousness of the grey area in captured exception errors, two methods are used to measure and present kernel software outages. A Best-Case-SW-Outage is identified only the exception error codes caused purely by a software fault. The Best-Case-SW-Outage excludes any gray area exception error codes that could result from a hardware fault. A Worst-Case-SW-Outage is also generated that includes all the gray error codes that could be attributed fully or partially by software faults. Worst-Case-SW-Outages could possibly be attributed to hardware faults, but could just as readily be attributed to a software fault.

For example, all error codes 220, 222, 224 and 226 in FIG. 16 are identified as a Worst-Case-SW-Outages 228 since any one of these error codes could be caused by software. However, overflow errors 224 and address errors 224 can only be caused by software faults. Therefore, when overflow error code 224 or address error code 226 are detected, they are also classified as Best-Case-SW-Outages 230.

Figure 17:
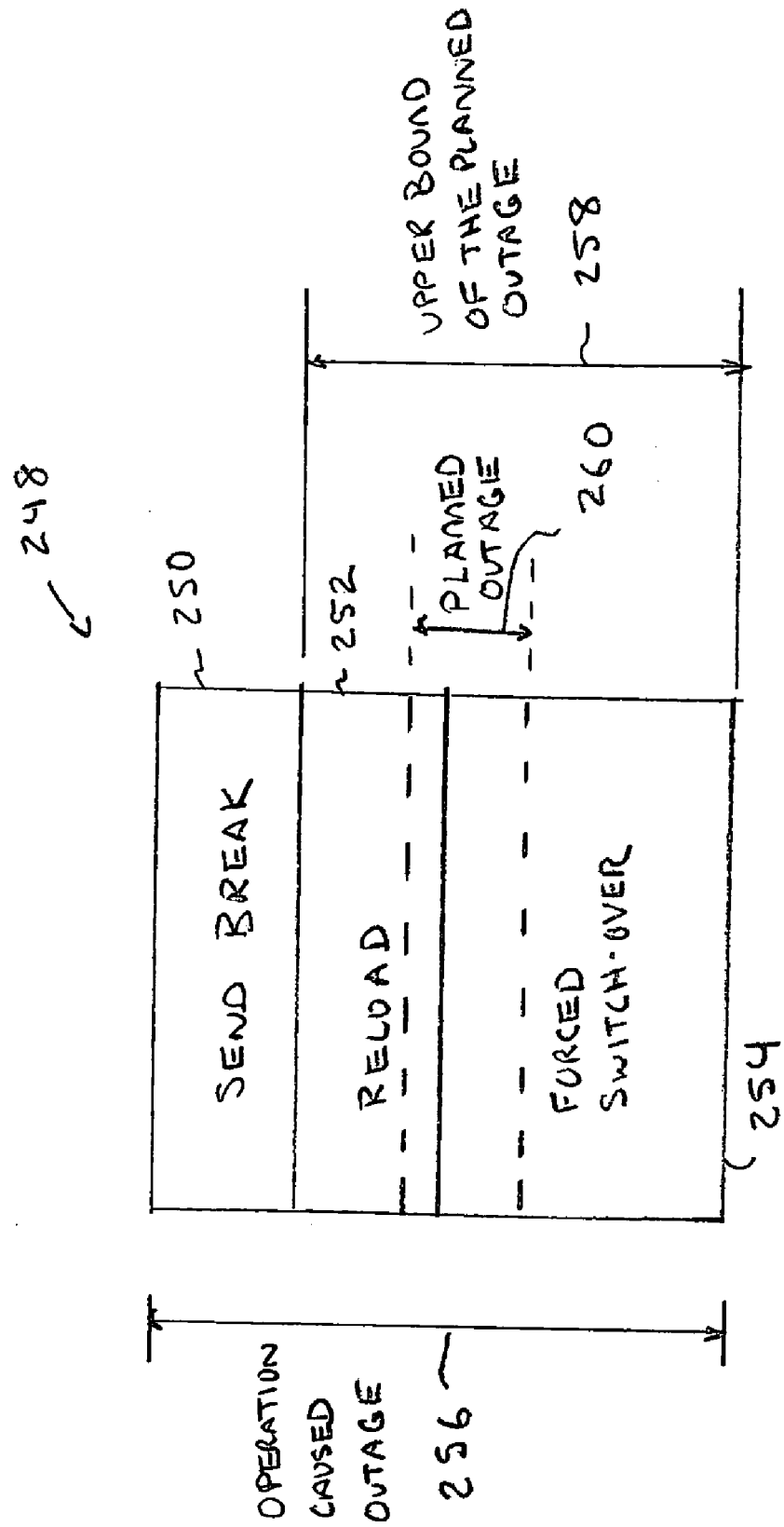
FIG. 17 is a chart showing how operational outages are classified as planned and unplanned.

Referring to FIG. 17, in another embodiment, kernel software outages caused by operational events 248 are measured apart from the unplanned kernel software outages. The operational CLI commands such as a "reload" CLI command 252 or a "forced switch-over" CLI command 254 are captured and stored in persistent storage. Any available error codes (e.g., Break Point) are also intercepted and stored in the persistent storage during a system crash due to "Send Break" CLI command 250.

The operational events 248 in the persistent storage are checked during system restart. A rule is used to derive an upper bound 258 (i.e. worst case) for planned outages of the operational events 248. If no error codes associated with the outage exist in the persistent memory, and if a reload 252 or forced switch-over 254 is captured in the persistent memory, the outage is considered as an upper bound 258 of the planned software outages.

The best case 260 for the planned outages may be smaller, since some number of CLI reload 252 and forced switch-over 254 CLI commands may be initiated by the system administrator to resolve unplanned outages such as memory leaks and system hangs. Further, other unplanned reload or forced switch-over operational outages could be generated by an unauthorized system hacker. The "Send Break" CLI command 250 is excluded from the upper bound 258 of the planned outages, since the "Send Break" command 250 is not considered a maintenance or upgrade operation but a system-hang error resolution operation.

Figure 18:
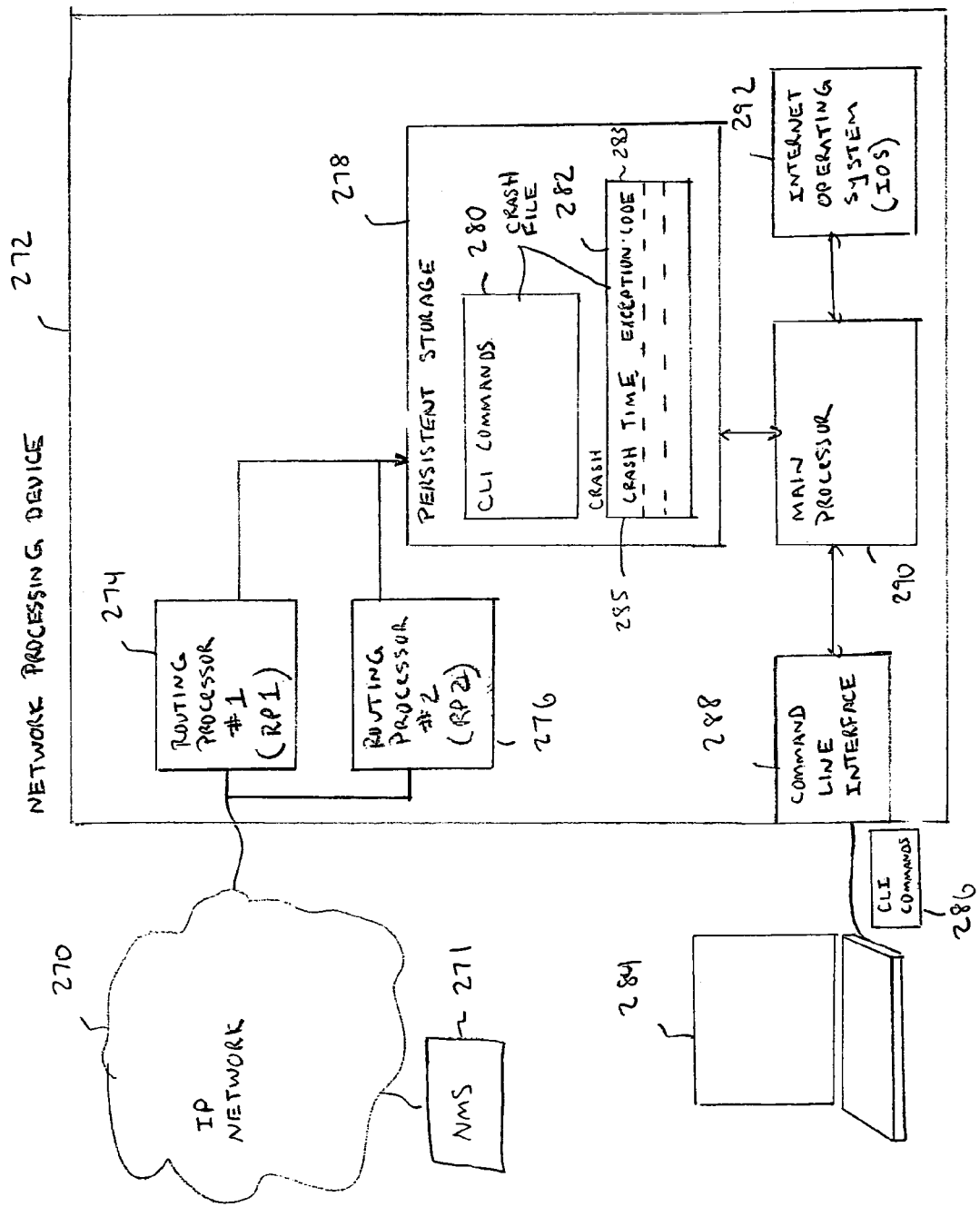
FIG. 18 is a block diagram of a network processing device that classifies software, hardware, and operational outages.

FIG. 18 is a block diagram of a network processing device 272 that provides the software outage measurement capabilities described above. The network processing device 272 may be a router, switch, gateway, server, or any other type of computing device that needs to be monitored for software outages. The network processing device 272 in this example includes a first routing processor 274 and a second back-up routing processor 276 that are both coupled to an Internet Protocol (IP) network 270. But, of course, there does not need to be two routing processors.

The two routing processors 274 and 276 are used for routing IP packets in the IP network 270. Internet Operating System (IOS) software 292 is generally used for operating a main processor 290, as well as routing processors 274 and 276. The IOS software 292 is generally used by the routing processors 274 and 276 for routing IP packets across the IP network 270 and used by main processor 290 for general operations.

The main processor 290 receives Command Line Interface (CLI) commands 286 from an external computer 284 via a command line interface 288. The CLI commands 286 are generally used for conducting maintenance and administration operations in the network processing device 272. The main processor 290 captures and stores crash data in a storage device 278 embedded in the network processing device 272. The crash data includes a CLI crash file 280 and error code crash file 282. In one example, the storage device 278 is non-volatile Random Access Memory (NVRAM), such as Flash memory.

The IOS software 292 and other application software in the network processing device 272 automatically generates exception codes 283 and associated crash times 285. This crash information is automatically captured and stored in the error code crash file 282. In one example, the exception codes 283 are MIPS error codes, however, any type of processor error codes can be captured and classified according to the invention. The crash times 285 in crash file 282 identify crash times when the outages happen. When the network processing device is restarted after an outage, the crash files 280 and 282 are automatically analyzed and outages automatically classified either by the main processor 290 or by a Network Management Server (NMS) 271 via the IP network 270.

Figure 19:
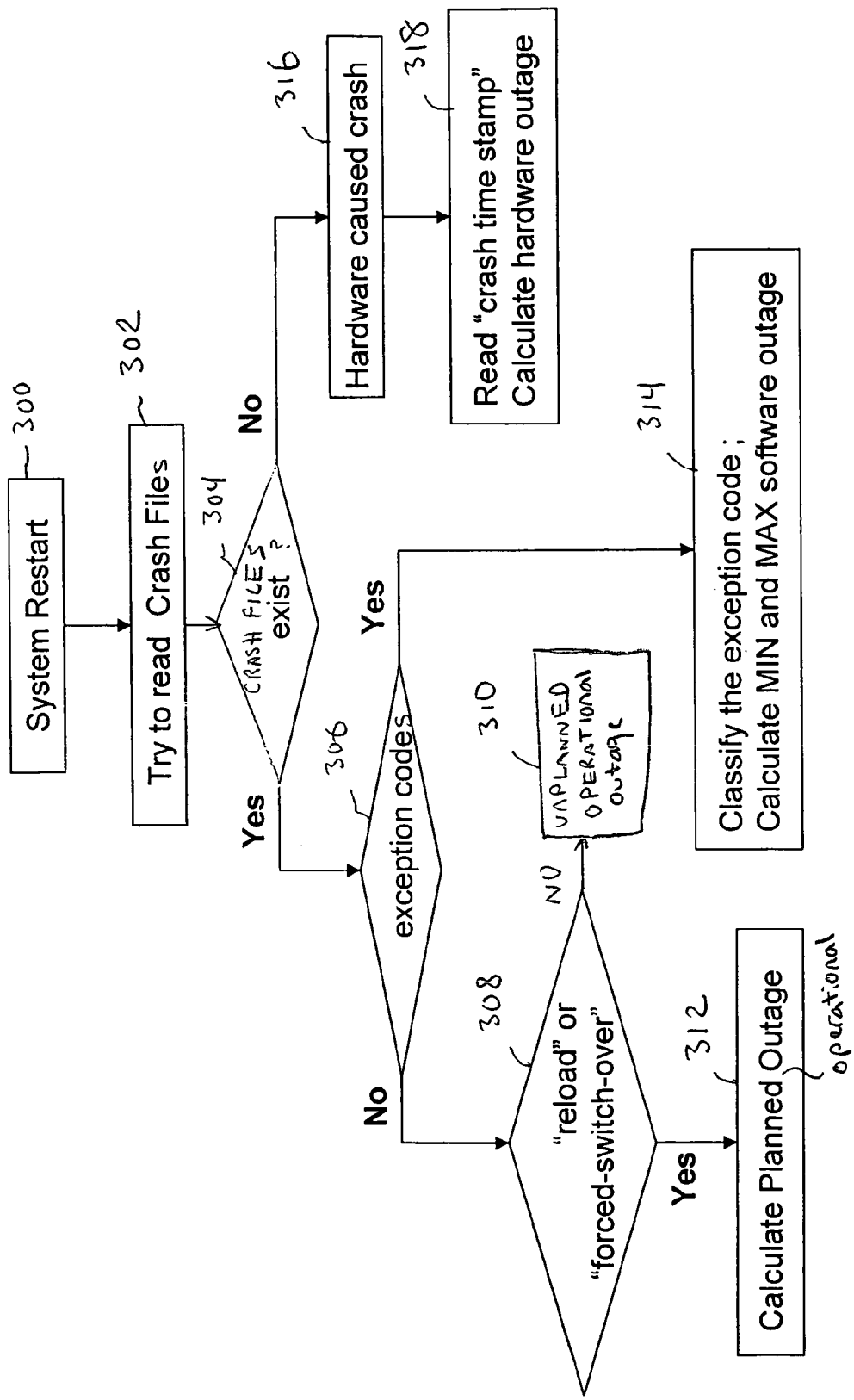
FIG. 19 is a flow diagram showing how the network processing device in FIG. 18 classifies outages.

FIG. 19 describes the operations performed in the network processing device 272 in FIG. 18. The network processing device 272 is restarted in block 300 after an outage. The main processor 290 or the NMS 271 tries to read the crash files 280 and 282 in block 302. For simplicity, the remainder of the description below refers to classification operations being performed by the main processor 290. However, these same classification operations could alternatively be performed by the NMS 271.

If no crash files exist in decision block 304, the outage is classified as a hardware fault in block 316. The crash time stamp is read and a hardware outage time is calculated in block 318. For example the crash time 285 of the recorded outage subtracted from the current time is the outage time. The main processor 290 or the NMS 271 (FIG. 18) may also generate NAF and MTBF data for the network processing device 272.

If a crash file exists in decision block 304, the main processor 290 looks for associated exception codes in decision block 306. If there is an exception code associated with the outage, the main processor 290 classifies the exception code as particular types of software and hardware outages in block 314 as described above and as described in further detail below in FIG. 20. For software classified outages, the main processor also determines the best case (MIN-IOS-SW) and worst case (MAX-IOS-SW) for the outage as previously described. The main processor or the NMS 271 can then generate other information associated with the particular outage classification. For example, such as MIN-IOS-SW NAF or MAX-IOS-SW MTBF.

If there are no exception codes 283 associated with the outage in decision block 306, but a CLI crash file 280 exists, the main processor 290 looks for CLI commands in the CLI crash file 280 associated with the outage. If a reload or forced switch-over CLI command has been captured and stored in decision block 308, the outage is identified as a planned operational outage in block 312. If the CLI command is not a reload or forced-switch over, then the outage is identified as an unplanned operational outage in block 310. For example, a reset CLI command would be classified as an unplanned operational outage in block 310. The main processor 290 then calculates any other statistical information necessary for the planned or unplanned operational outages in block 312 or 310, respectively, such as outage time, NAF, MTBF, etc.

FIG. 20 shows in more detail how exception codes are classified into different types of software and hardware outages. In this example, an error code of 0 is associated with an interrupt initiated outage. The IOS 292 (FIG. 18) may generate an interrupt error code 0 for example when an operation is caught in an infinite loop. This type of error code is categorized as both a max software fault and a hardware non-IOS fault, since generation of the interrupt could be attributed either to hardware or software. For example, the interrupt error code 0 could be caused when one of the routing processors tries to address a corrupted memory location. Alternatively, the interrupt error code 0 could be caused by faulty software generating an infinite loop condition.

An error code of 4 is associated with an address error and an error code of 15 is associated with a floating point error. Address errors and floating point errors are generally only caused by software. For example, storage of too many IP packets may cause one of the routing processors to generate an illegal memory address causing an address error code of 4. A software program that tries to divide a number by zero, or generates numbers that are too large, would generate a floating point error code 15. Since address errors and floating point errors are only associated with software faults, the error codes 4 and 15 are classified by the main processor as MAX-IOS-SW (worst case) software faults and also classified as MIN-IOS-SW (best case) software faults.

An error code of 9 is associated with a breakpoint fault. A breakpoint fault could be caused by someone manually generating a CLI break command or could be automatically generated by system software. The fault could be due to software or hardware. Therefore, the error code of 9 is categorized as a max software fault, a hardware fault, and an operational fault.

FIGS. 21A and 21B show examples of automatically generated reports showing the different categories of software and hardware outages. In a first report 350, there are no recorded outages for the network processing device. The numbers in the type column in report 350 are coded as follows: interface (1), physical entity (2), process (3), and remote object (4). The index column identifies a corresponding MIB table index (1), physical entity (2), or index in the entity MIB. The status column is up (1) or down (2). The last-change column identifies a last object status change time. The AOT column identifies an accumulated outage time and the NAF column identifies the number of accumulated failures associated with the outage category. Router-Device category refers to any outage that disables the network processing device. The MIN-IOS-SW category refers to best case estimation of software outages and the MAX-IOS-SW category refers to worst case estimation for software outages. The planned operational category refers to planned operational outages, and the unplanned operational category refers to unplanned operational outages.

The second report 352 is generated when the network processing device 272 in FIG. 18 is restarted after an outage. The AOT in report 352 is 291 and the NAF if 1. The reload outage is also identified as a planned operational outage since only a CLI reload command existed in persistent memory after the restart.

Regarding report 354, an outage is caused by the network processing devices accessing corrupted memory. The crash generates an error code 9 (breakpoint error). After the network processing device is restarted, the breakpoint error code 9 is classified as a software fault, hardware fault, and an unplanned operational fault. The NAF for the router-device is incremented along with the MAX-IOS-SW NAF, and unplanned operational category. The AOT for all three categories are updated with the amount of outage time for the corrupted memory fault.

Regarding report 356, an address error (error code 4) is generated by fetching code from an illegal address. This type of error code can only be caused by software. Thus in report 356 the overall router-device, MIN-IOS-SW and MAX-IOS-SW NAF categories are all incremented and the associated AOTs increased by the time of the address error outage.

Figure 22:
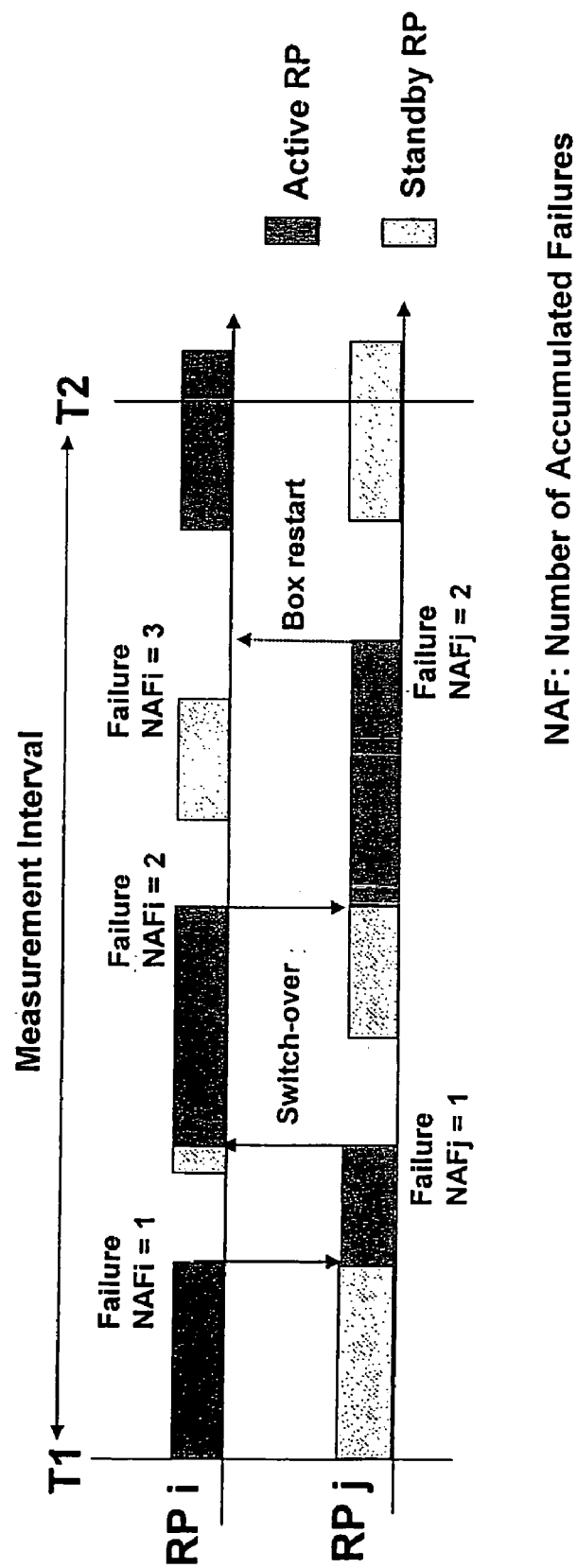
FIG. 22 shows how software outages are identified for individual routing processors in a dual processor network processing device.

FIG. 22 shows how software outages are identified for each individual routing processor. Referring to FIGS. 18 and 22, the error codes described above are generated for both routing processor 274 and 276. In FIG. 22, routing processor 274 is referred to as RP i, and routing processor 276 is referred to as RP j.

The crash files 280 and 282 in memory 278 store the error codes for both RP i and RP j. Thus, the NAF and MTBF can be calculated for both individual routing processors and the overall NAF and MTBF for the overall network processing device 272 containing both routing processors. The overall NAF and MTBF for network processing device 272 can be derived by checking the crash times for the individual routing processors. If both routing processors 274 and 276 have failed at the same time, then the NAF for the entire box 272 is incremented and the overall time that both routing processors are crashed is used to calculate the MTBF for the overall box.

Because the present invention captures CLI commands for forced routing processor switch-overs, planned outages can be detected in a dual-processor system. This is not possible in other systems that use UNIX based error codes that only identify reboot reasons.

More comprehensive crash reasons are derived by analyzing both the exception errors and CLI commands within the router. Instead of manually calculating the software reliability, the software reliability measurement and calculation are automatically generated. An embedded approach is used that measures and stores the outage data on the router device. This allows the outage data to be retrieved at any time. This is more reliable compared to a remote device based measurement where the measurement data can be lost due to unreliable SNMP traps.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

We claim:

1. A method comprising:
capturing error codes associated with detected outages in a storage medium located in a network processing device; and
automatically classifying the error codes into software caused outages and hardware caused outages; and
automatically classifying the software caused outages as:
planned outages that are user-directed and occur according to a predefined outage schedule, the planned outages associated with scheduled maintenance;
first unplanned outages that are user-directed but occur independently of the predefined outage schedule, the first unplanned outages corresponding to manually initiated resets, manually initiated reloads and manually initiated processor-switchovers that are manually initiated during unscheduled maintenance; and
second unplanned outages that occur independently of manually initiated resets, manually initiated reloads and manually initiated processor-switchover and occur independently of the predefined outage schedule, the second unplanned outages associated with device-disabling software errors; and
outputting a representation of the classifications.

2. The method according to claim 1 further including automatically classifying a subset of the hardware caused outages as Online Insertion Removal (OIR) outages that occur according to the predefined outage schedule.

3. The method according to claim 1 including classifying the software caused outages as planned outages when a maintenance or planned upgrade command is detected and no error codes are associated with the software caused outages.

4. The method according to claim 3 including classifying the software caused outages as first unplanned outages when error codes and manually initiated commands are associated with the software caused outages.

5. The method according to claim 4 including:
classifying the error codes as a worst case software caused outages where the error codes could be associated with either hardware caused outages or software caused outages; and
classifying the error codes as a best case software outage when the error codes could only be associated with software caused outages.

6. The method according to claim 1 including identifying the software caused outages and the hardware caused outages for multiple individual router processors in the network processing device.

7. The method according to claim 1 including computing an Accumulated Outage Time (AOT) and Number of Accumulated Failures (NAF) for the software caused outages and the hardware caused outages.

8. The method according to claim 1 including identifying the software caused outages as second unplanned outages when an unscheduled, non-user-directed reset is associated with the software caused outages.

9. The method according to claim 1 including storing the error codes in a local persistent memory.

10. A method comprising:
monitoring outages in a network processing device;
identifying a monitored outage as a hardware caused outage when no crash information is stored, otherwise identifying a monitored outage as a possibly software caused outage;
monitoring manually initiated commands to the network processing device; and
classifying the possibly software caused outages as planned outages when the possibly software caused outages occur according to a predefined schedule;
classifying the possibly software caused outages as first unplanned operational outages when the possibly software caused outages occur according to the manually initiated commands;
classifying the possibly software caused outages as second unplanned outages when the possibly software caused outages occur independently of the predefined schedule and independently of the manually initiated commands; and
outputting a representation of the classifications.

11. The method according to claim 10 including:
capturing error codes associated with at least some of the possibly software caused outages;
storing the error codes in persistent memory;
storing the manually initiated commands in persistent memory; and
automatically analyzing the stored error codes and manually initiated commands to distinguish first unplanned operational outages from second unplanned outages.

12. The method according to claim 11 including classifying error codes that are possibly hardware caused outages as hardware outages and identifying the error codes that are possibly software caused outages as software outages.

13. The method according to claim 12 including identifying the error codes that are possibly hardware or software caused outages as worse case software outages and identifying the error codes that are only software caused outages as best case software outages.

14. The method according to claim 10 including capturing information associated with a mean time between failures or a number of accumulated failures for the monitored outages.

15. The method according to claim 10 including:
identifying monitored outages associated with a first routing processor;
identifying monitored outages associated with a second backup routing processor; and
identifying monitored outages associated with a network processing device containing both the first routing processor and the second backup routing processor.

16. A network processing device, comprising:
a processor configured to capture error codes associated with network processing device outages and then automatically classify the error codes as software caused outages and hardware caused outages;
a first routing unit and a second back-up routing unit that each generate error codes individually classified by the processor as hardware caused outages and software caused outages; and
a persistent memory for storing a crash file containing the error codes and user inputted instructions, the processor identifying the hardware and software outages and the planned and unplanned operational caused outages according to the error codes and the user inputted instructions in the crash file.

17. The network processing device according to claim 16 wherein the processor is further configured to identify operational caused outages and then distinguish planned operational caused outages from unplanned operational caused outages.

18. The network processing device according to claim 16 wherein the processor is further configured to classify software outages as worst case and best software caused outages according to the associated error codes.

19. The network processing device of claim 16 wherein the processors are further operable to:
compute a software Mean Time Between Failure (MTBF) range using the best and worst case software caused outage classifications; and
send the software MTBF range to the NMS.

20. A network processing device, comprising:
a processor configured to capture error codes associated with network processing device outages and then automatically classify the error codes as software caused outages and hardware caused outages;
wherein the processor is further configured to identify operational caused outages and then distinguish planned operational caused outages from unplanned operational caused outages; and
a persistent memory for storing a crash file containing the error codes and Command Line Interface (CLI) commands, the processor identifying the hardware and software outages and the planned and unplanned operational caused outages according to the error codes and the CLI commands in the crash file.

21. The network processing device according to claim 20 wherein the processor is configured to identify outages that have no associated crash files as hardware outages, identify outages associated with reload or forced-switch-over CLI commands with no associated error codes as planned operational caused outages.

22. A system for detecting outages, comprising:
means for capturing error codes associated with outages in a network processing device in a storage medium;
means for automatically classifying the error codes into software caused outages and hardware caused outage categories;
means for automatically classifying at least some of the outages as planned operational outages and unplanned operational outages;
means for classifying outages as planned operational outages when a maintenance or planned upgrade command is detected and no error codes are associated with the outages;
means for classifying outages as software, hardware, and unplanned operational outages when error codes and manually initiated commands are associated with the outages and
means for outputting a representation of the classifications.

23. A system according to claim 22 including means for identifying the outages as unplanned operational outages when a manual reset command is associated with the outages.

24. A system according to claim 22 including:
means for classifying the error codes as a worst case software caused outages where the error codes could be associated with either hardware caused outages or software caused outages; and
means for classifying the error codes as a best case software outage when the error codes could only be associated with software caused outages.

25. A system according to claim 22 including means for identifying the software caused outages and the hardware caused outages for multiple individual router processors in the network processing device.

26. A system according to claim 22 including means for computing an Accumulated Outage Time (AOT) and Number of Accumulated Failures (NAF) for the software caused outages and the hardware caused outages.

27. A system according to claim 22 including:
means for capturing the error codes that are generated in association with the outages; and
means for storing the error codes in a local persistent memory.

28. A computer storage medium storing instructions for execution and when executed operable to:
capture error codes associated with outages in a network processing device;
automatically classify the error codes into software caused outages and hardware caused outage categories;
automatically classify at least some outages as planned operational outages and unplanned operational outages;
classify outages as planned operational outages when a maintenance or planned upgrade command is detected and no error codes are associated with the outages; and
classify outages as software, hardware, and unplanned operational outages when error codes and manually initiated commands are associated with the outages.

29. The logic of claim 28 further operable to identify the outages as unplanned operational outages when a manual reset command is associated with the outages.

30. The logic of claim 28 further operable to
classify the error codes as a worst case software caused outages where the error codes could be associated with either hardware caused outages or software caused outages; and
classify the error codes as a best case software outage when the error codes could only be associated with software caused outages.

31. The logic of claim 28 further operable to identify the software caused outages and the hardware caused outages for multiple individual router processors in the network processing device.

32. The logic of claim 28 further operable to compute an Accumulated Outage Time (AOT) and Number of Accumulated Failures (NAF) for the software caused outages and the hardware caused outages.

33. The logic of claim 28 further operable to:
capture the error codes that are generated in association with the outages; and
store the error codes in a local persistent memory.

34. A network processing device, comprising:
one or more processors; and
a memory coupled to the processors comprising instructions executable by the processors, the processors operable when executing the instructions to:
capture error codes associated with network processing device outages;
classify the error codes as hardware caused outages when the error codes could only be caused by a hardware crash;

classify the error codes as best case software caused outages when the error codes could only be caused by a software crash;
classify the error codes as worst case software caused outages when the error codes are ambiguous; and
send the classifications over a packet switched network for further processing at a remote Network Management System (NMS).

35. The network processing device of claim 34 wherein the processors are further operable to:
compute a software Mean Time Between Failure (MTBF) range using the best and worst case software caused outage classifications; and
send the software MTBF range to the NMS.

* * * * *